(12) United States Patent
Russell et al.

(10) Patent No.: US 10,997,244 B2
(45) Date of Patent: May 4, 2021

(54) METHOD AND SYSTEM FOR IDENTIFYING AND DISCOVERING RELATIONSHIPS BETWEEN DISPARATE DATASETS FROM MULTIPLE SOURCES

(71) Applicants: Anne V. Russell, Arlington, VA (US); Bernard J. Quinn, III, Pasadena, MD (US)

(72) Inventors: Anne V. Russell, Arlington, VA (US); Bernard J. Quinn, III, Pasadena, MD (US)

(73) Assignee: Phylot Inc., Washington, DC (US)

( * ) Notice: Subject to any disclaimer, the term of this patent is extended or adjusted under 35 U.S.C. 154(b) by 464 days.

(21) Appl. No.: 15/650,757

(22) Filed: Jul. 14, 2017

(65) Prior Publication Data

US 2019/0018904 A1   Jan. 17, 2019

(51) Int. Cl.

| | | |
|---|---|---|
| G06F 17/00 | (2019.01) | |
| G06F 16/901 | (2019.01) | |
| G06F 21/56 | (2013.01) | |
| G06F 16/27 | (2019.01) | |
| G06F 16/242 | (2019.01) | |
| G06F 16/248 | (2019.01) | |
| G06F 16/22 | (2019.01) | |
| G06F 16/2457 | (2019.01) | |

(52) U.S. Cl.
CPC ...... *G06F 16/9024* (2019.01); *G06F 16/2228* (2019.01); *G06F 16/243* (2019.01); *G06F 16/248* (2019.01); *G06F 16/24578* (2019.01); *G06F 16/27* (2019.01); *G06F 21/56* (2013.01); *G06F 2221/033* (2013.01); *G06F 2221/034* (2013.01); *G06F 2221/2111* (2013.01)

(58) Field of Classification Search
CPC .. G06F 16/9024; G06F 16/2443; G06F 16/27; G06F 16/243; G06F 16/248; G06F 16/2228; G06F 16/24578; G06F 21/56; G06F 2221/033; G06F 2221/2111; G06F 2221/034

See application file for complete search history.

(56) References Cited

U.S. PATENT DOCUMENTS

| | | | | |
|---|---|---|---|---|
| 2012/0059843 A1* | 3/2012 | O'Donnell | .......... | G06F 16/9535 707/769 |
| 2012/0124027 A1* | 5/2012 | Hnatio | .................. | G06N 5/022 707/709 |
| 2014/0195515 A1* | 7/2014 | Baker | ..................... | G06F 16/26 707/722 |
| 2015/0286747 A1* | 10/2015 | Anastasakos | ....... | G06F 16/9017 707/776 |
| 2016/0055205 A1* | 2/2016 | Jonathan | ............. | G06F 16/9024 707/714 |

(Continued)

*Primary Examiner* — Syed H Hasan
(74) *Attorney, Agent, or Firm* — Michael L. Greenberg, Esq.; Greenberg & Lieberman, LLC

(57) ABSTRACT

A graph-based data cataloging system, product and method that structures expert knowledge and statistically driven data analytics into a system-based framework for finding and relating enhanced metadata on subject-relevant, curated datasets from disparate, externally held data sources is shown. Displayed across a knowledge graph of nodes of datasets linked by their metadata attributes, the system simplifies the search and retrieval of multiple datasets of relevance to a user's technical, content, and resource-driven needs.

19 Claims, 21 Drawing Sheets

To FIG. 1B

(56) References Cited

U.S. PATENT DOCUMENTS

2016/0189028 A1* 6/2016 Hu ........................ G06N 5/02
                                                                706/46
2017/0221240 A1* 8/2017 Stetson ................ G06F 16/904
2018/0314603 A1* 11/2018 Gibbons, Jr. ............. G06F 7/00

* cited by examiner

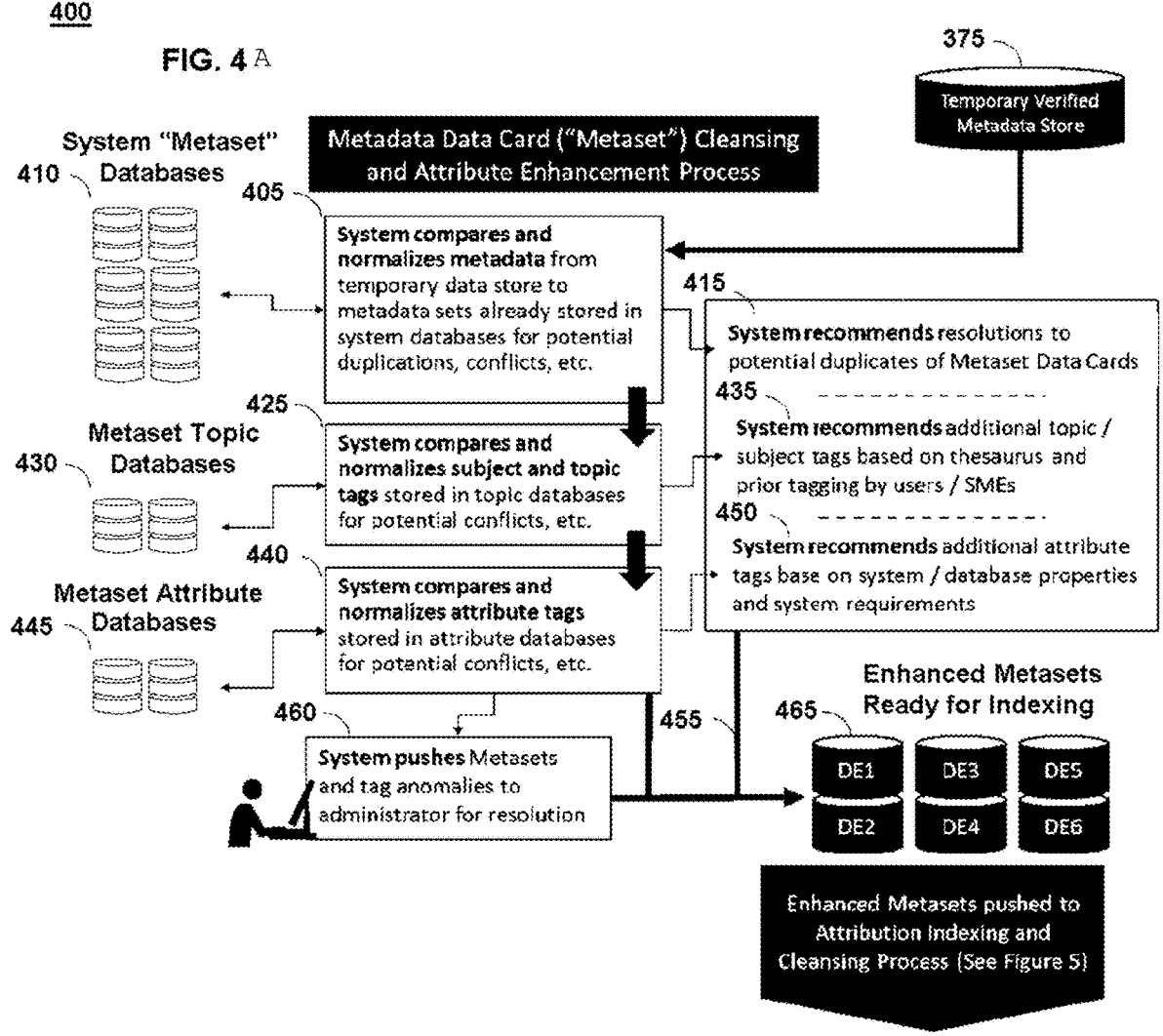

420

Sample Metadata Categories

Metadata Topic/Subject Tags
- Direct – Extensions / Thesaurus
- Indirect – Users / SMEs

Common Metadata Attribute Samples
- Dataset Name
- Dataset Description
- URL
- Data Formats

Enhanced Metadata Attribute Samples
- Dataset Ownership, Licensing, IP
- Dates (Last Updated, Content Range)
- Dataset geographic range
- # Records
- Dataset Update frequency
- User Recommendations

Example shows how different combinations of datasets with shared attributes can provide more complete data coverage for analysis

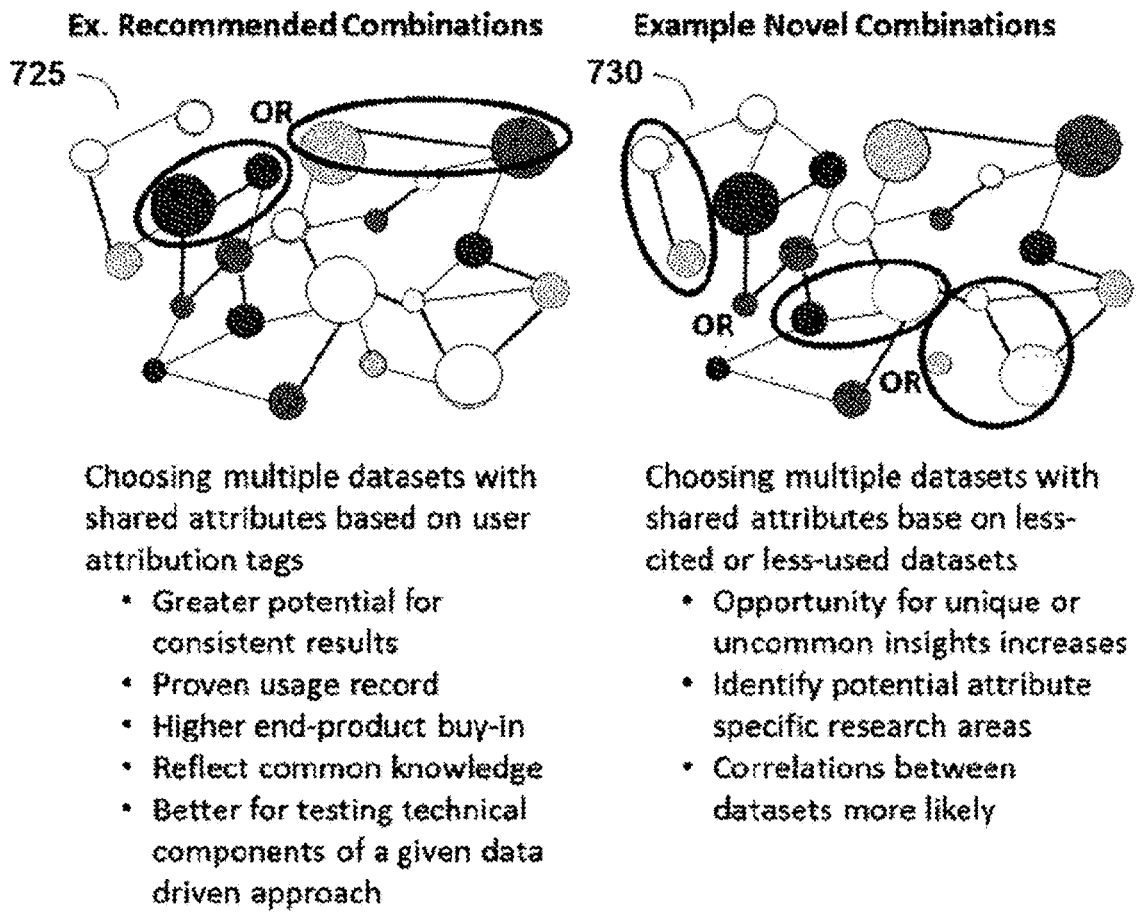

Ex. Recommended Combinations 725

Choosing multiple datasets with shared attributes based on user attribution tags
- Greater potential for consistent results
- Proven usage record
- Higher end-product buy-in
- Reflect common knowledge
- Better for testing technical components of a given data driven approach Example Novel Combinations 730

Choosing multiple datasets with shared attributes base on less-cited or less-used datasets
- Opportunity for unique or uncommon insights increases
- Identify potential attribute specific research areas
- Correlations between datasets more likely

METHOD AND SYSTEM FOR IDENTIFYING AND DISCOVERING RELATIONSHIPS BETWEEN DISPARATE DATASETS FROM MULTIPLE SOURCES

FIELD OF THE PRESENT INVENTION

The present invention relates in general to technology fields, and in particular to data card and cataloging systems, as well as systems designed to link, display, and enable the searching of dataset metadata within a knowledge graph to help system users identify datasets relevant to their analytic needs.

BACKGROUND OF THE PRESENT INVENTION

In recent years, the proliferation of data driven approaches and technologies has led to an exponential growth in the quantity of structured and unstructured data available for exploitation. Yet little has emerged to identify data that is usable with a given technique and relevant to a given problem set. Digital catalogs of ready-to-use datasets are few and far between. Where they exist, dataset curation focuses largely on a dataset's structural attributes, their licensing rights, or on the fact they exist at all, minimizing the relative utility and usability of a dataset's content to basic crowdsourced keyword tags. Most curation efforts reflect the efforts of technically savvy curators with limited subject matter expertise compiling blog lists of URLs across social media and other data specific sites (e.g., Quora, GitHub, Reddit, Data Science Central). Where databases exist, whether in academia or elsewhere, they are built predominately on relational structures—inhibiting the ability to index and link datasets—and tend to reflect single subject matter expertise or types of data content providers.

Four distinct, but related challenges affect the development of capabilities to identify usable datasets of relevance.

Paradox of Data Searches—Despite the vast and growing stores of datasets, those that will simultaneously work with a user's chosen technological approach and provide the insight and detail of relevance to help with decision making are relatively few and far between. Possible solutions should enable users to find data of relevance in a timely manner, using processes that leverage expert knowledge in organizing information and semantic search techniques to optimize the relevancy of search results.

Content Quality—A dataset curation system is only as good as the quality of the datasets it makes searchable. As fake websites, news sites, journals, and accounts grow across connected networks, assuring the quality of datasets has become paramount to any search process. In any new approaches, traditional back end processes to identify and block fake sites, questionable metadata or malicious code, should be enhanced with a hybrid method of pattern recognition algorithms and human quality assurance editing to block or identify unsubstantiated claims, questionable evidence or data collection methodologies, or controversial or "biased" content to fully inform users of the choices before them.

Need for Multiple Datasets—Rarely does one dataset provide sufficient content on its own to fuel data driven insight. Most data projects need multiple datasets with interconnected content that are compatible to their technical approach. Current curation efforts created as blogs on media sites or within relational database structures do not provide the means to identify combinations of usable and relevant datasets based on common attributes. Emerging systems should take full advantage of graph databases, and develop indices to link datasets that are consistent with standard indexing practices in the library and curation sciences.

Ingest Costs—Data is not free. Even data that is open and public costs time, energy, and resources to Extract, Transform, and Load (ETL). In addition to data quantity and relevance, cleanliness, duplications, usability, and dataset content impact final costs and ultimately, the quality of any derived insight. Curation systems should provide methods to help users determine what combinations of datasets will best meet their needs before making their choices.

The development of graph databases, knowledge graph visualizations, and semantic searching and recommendation algorithms, among other machine techniques, provides a unique, novel foundation for data curation systems. Thus, there is a need for a technology solution that leverages these technologies along with subject matter and technical expertise into a system that enables its users to find datasets of direct relevance to their technical and content driven needs.

SUMMARY OF THE PRESENT INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed are a system and accompanying products and methods to organize, display, and make metadata on datasets, referred to here as "metasets," searchable within a knowledge graph data cataloging and curation framework. Further detailed are novel processes that enable users interacting with the disclosed system to find and match multiple, linked datasets of relevance to their approach, and to rapidly determine which combinations of dataset will best suit their needs.

The system first enables ingest, categorization, and enhancement of metadata from multiple, disparate, externally held datasets for display in the system's knowledge graph visual environment. Metadata from external datasets are augmented with additional attributes present on the system's data cards. Once enhanced, metadata information on each dataset is referred to as a "metaset," or a collection of metadata information that reveals key decision making information about an external dataset.

Upon identification, metadata on datasets are fed through a hybrid system-based quality assurance process to establish the validity and authenticity of a data source before ingestion into, and enhancement within, the system. Verified, enhanced dataset metadata is filtered through the system's attribute indexing and cleansing process—a hybrid attribute indexing system that relates metadata attributes based on expert domain knowledge and system analytics to determine the usefulness and relevance of dataset content to subjects and topics, geographical, temporal, and technical points of reference. The system uses this indexing process to relate newly ingested metasets to metasets already stored in the dataset cataloging system. The indexed metasets are then made searchable to a user in the system's knowledge graph interface.

Within the system, users interact with a knowledge graph of metasets to search for query-related datasets. A user initiates a search to bring back a knowledge graph of metasets of dataset information. To choose metasets to display, the system uses a weighting index scale that considers dataset relevancy and popularity in relation to the user's query, geographical and temporal attributes, and technical specifications for using a dataset with different data driven approaches and technologies. The graphic interface also displays links between metasets nodes based on the number of metadata attributes that datasets share, enabling the user to rapidly discover combinations of datasets of interest. In alternate displays, users can view metasets related to their search query in the context of their geographical or temporal distributions, or add display layers that provide them with additional information on users, metrics, and use cases associated with their search query. Users can also sort metasets to explore and classify datasets by different metadata attributes, the relative relevancy or popularity of datasets, or by other statistically relevant classification schema.

To learn more about datasets represented in a given metaset knowledge graph display, users can scroll over links and nodes to reveal content directly related to core attributes of a given metaset node. Users can also click on nodes and links to reveal more detailed information.

From the display, users can also highlight multiple metasets to compare and contrast combinations of datasets that provide data and content coverage related to the user's problem set. Using the system's built in network algorithms, users can then explore how metasets nodes that are not directly linked to each other can be combined with others to provide more complete data coverage. The system may highlight paths to complete coverage based on network algorithms showing the shortest path between two nodes, the path reflecting the most shared metadata attributes or the least costly path, among other embodiments.

Before a user makes a final choice, the system creates a comparison matrix that allows the user to contrast datasets for download in the context of acquisition parameters that could affect the users dataset choice, including but not limited to dataset cost, number of records, licensing restrictions, data formats, update frequency, etc. The system also recommends other relevant or popular datasets that share similar attributes for consideration as well as other related data services including but not limited to data cleansing, data feed, analytic data tool, and data storage accessible within the system.

In a separate personalized page, users can access metasets and additional services available to them based on their subscription level. They may include, but are not limited to embodiments such as the ability to download and work with data from the data source, store projects and preferences, and access other content available to them. Services may also include features such as access to collaborative communities of users, recommended and newly added or popular datasets, and access to articles, training sessions, blogs and other content produced by the systems community of users, among others.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The present invention will be better understood with reference to the appended drawing sheets, wherein:

The accompanying drawings, which are incorporated herein and form a part of the specification, illustrate the present invention and, together with the description, further serve to explain the principles of the invention and to enable a person skilled in the pertinent art to make and use the invention.

FIG. 4A shows a simplified process diagram for cleansing and enhancing metadata attributes from externally held datasets into metasets stored within the system, according to an example embodiment.

FIG. 4B shows a continuation of the simplified process diagram for cleansing and enhancing metadata attributes from externally held datasets into metasets stored within the system, according to an example embodiment.

FIG. 7C shows a series of simplified process diagrams detailing how a user could choose different combinations of metasets based on shared direct or indirect attribute linkages from knowledge graph visualizations, according to an example embodiment.

Figure 1A:
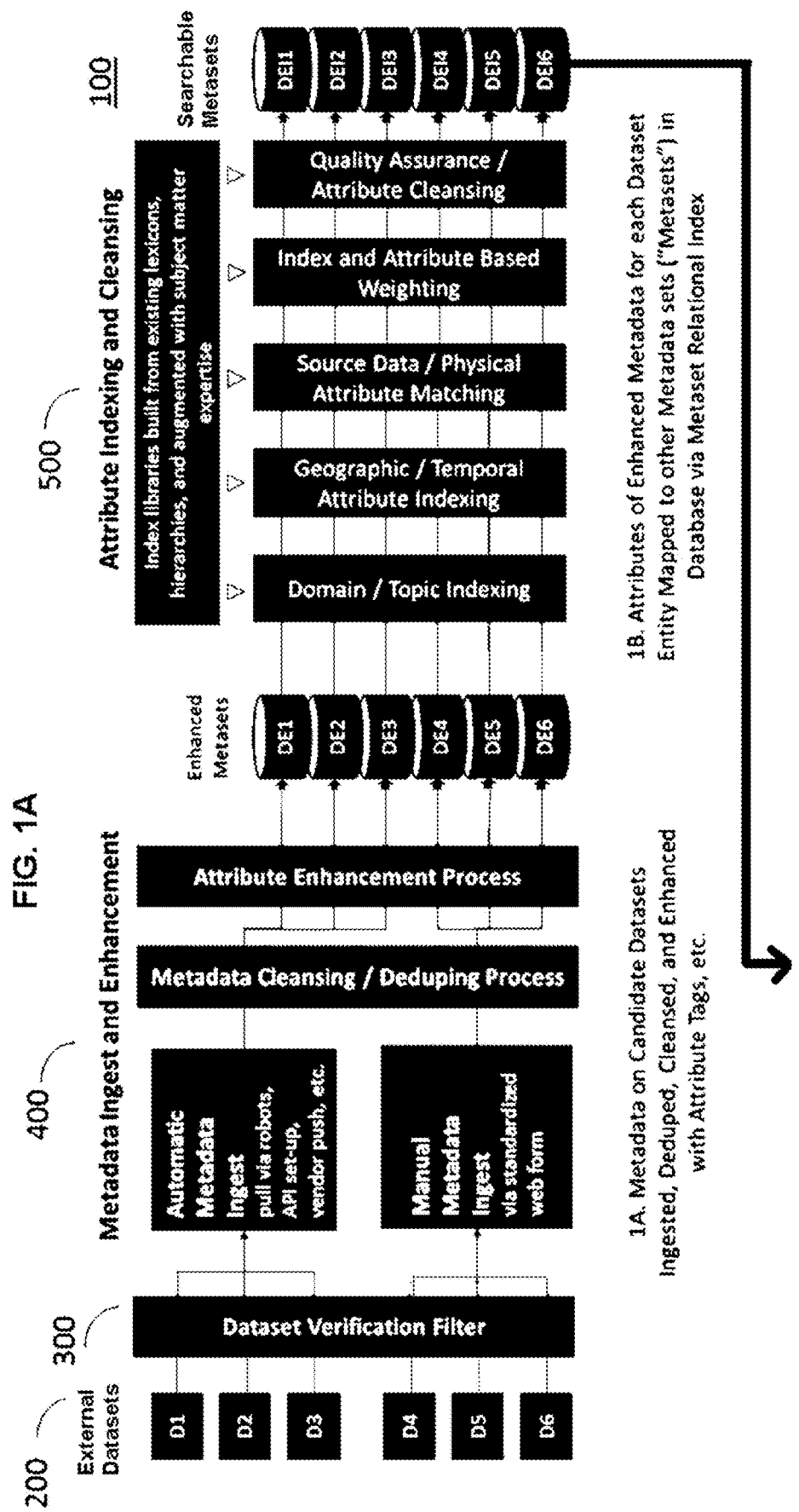
FIG. 1A shows a simplified process diagram of the invention environment highlighting how datasets are transformed into metasets and presented in knowledge graphs, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection.

II. Example Embodiments

Figure 1B:
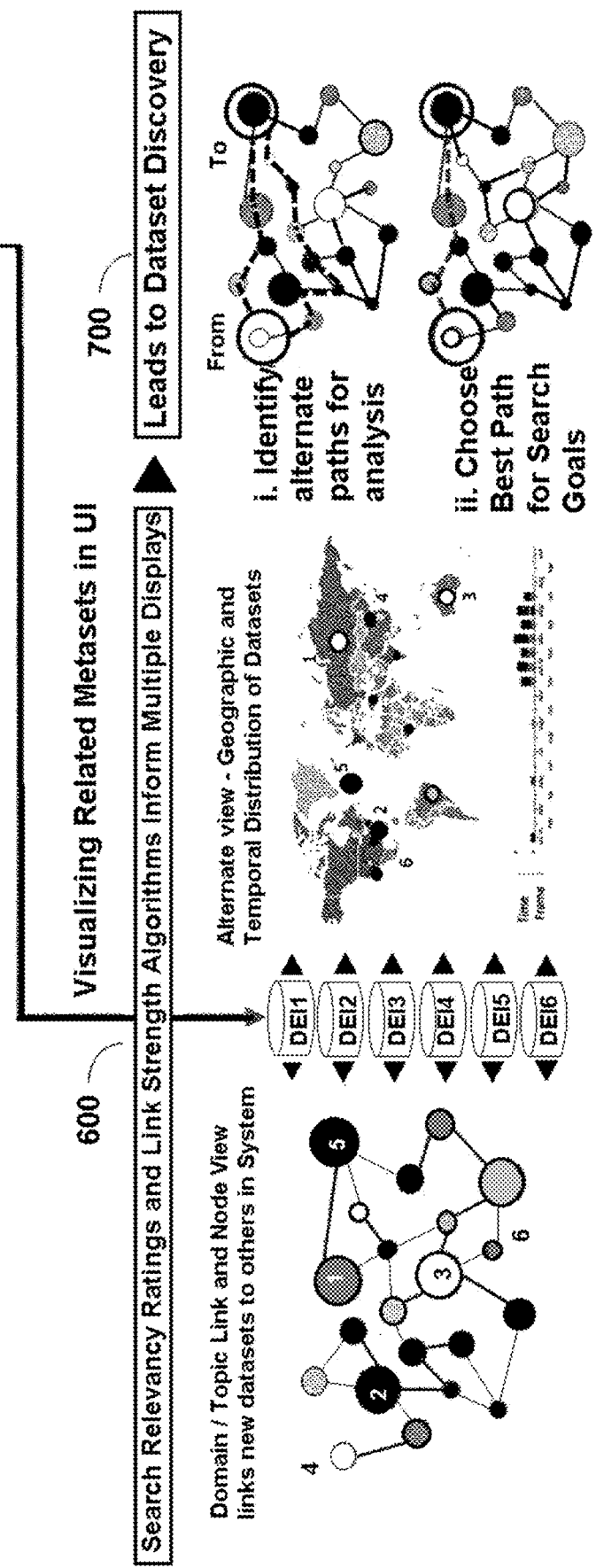
FIG. 1B shows a simplified process diagram of the invention environment highlighting how datasets are transformed into metasets and presented in knowledge graphs, according to an example embodiment.

FIG. 1 provides an outline of the different processes embodied in the invention, each of which are described in fuller detail in following subsections, according to an example embodiment. Embodiments relate to a network accessible computer-based dataset curation system and process that enables: the systematic verification and authentication 130 of datasets 120 that exist outside of the system before ingest; and, the ingest of metadata, enhancement of metadata attributes that may include topic/subject, geographic, temporal, technical, and other properties featured within an external dataset, and the recording of enhanced metadata attributes in unique collections of metadata datasets, or metasets, represented in system held data cards 140. Embodiments also relate to the systematic method of indexing, weighting and cleansing 150 of metadata attributes to establish relationships between enhanced metasets and the database of existing metasets already held within the system in preparation for visual representation 160. Embodiments are also related to system processes that enable the analysis of metadata related to a user's search for datasets within the system for the purposes of establishing and weighting nodes and linking them by metadata attributes through techniques familiar to those skilled in art of knowledge network theory. The embodiments also relate to graphic link and node displays 170 as well as alternate displays 180 that may include geospatial, temporal, histogram and other statistically based analysis that falls within the knowledge base of those skilled in the art of geospatial, temporal, and graph theory. Further embodiments relate to the application of network theory familiar to those skilled in the art to the analysis of links and identification of disparate potential paths between nodes that are not directly linked in a graph 190. Further embodiments relate to enabling the user's ability to compare and contrast the metaset attributes and benefits of multiple datasets in context of each other, and to weigh the inputs of other system users and system recommendations for alternate datasets before committing to any financial, licensing, or other data restrictions as defined by the owner of an externally held dataset. Additional embodiments are related to providing each system user with a personalized landing page where users can: track prior searches; search for and find new datasets; receive recommendations for new datasets based on a hybrid collaborative filtering and content based recommendations by subject matter experts; download authorized data for use with externally held analytic tools; store data and projects within the system; view and access other site content, and, collaborate with other system users.

Such embodiments may be implemented on a variety of environments that may include cloud based services, multiple computing devices, servers, storage, and network configurations and related applications and services to empower the system and processes described herein. Computing devices may include stationary or mobile devices, desktop computers, mobile computers or computing systems, notebook computers, tablet computers, mobile phones, wearable computers, or other types of mobile devices. Servers may be implemented in one or more computer systems, include one or more servers, and include any type of computing device described herein or that otherwise encompasses the capabilities of enabling the system functionality described herein. Computing devices and services may be coupled to networks, whether by wired links, wireless personal area network (PAN) links, Wireless LAN (WLAN) links, Worldwide Interoperability for Microwave Access (Wi-MAX) links, cellular network links, Ethernet links, USB links or other available network linking systems. Data storage, including temporary, verified, and system dataset metadata stores, user profile data, attribute index and weighting data, payment data, may have the format of a relational database, graph based database, or other format, and may include one or more of any type of storage mechanism to store system data and metadata, including magnetic discs, optical discs, magnetic tapes, memory devices such as RAM or ROM, or any other suitable storage medium. System applications may be configured to be accessed from cloud based services, as enterprise level client-server, as a desktop application, or in any other configuration that facilitates system use with metadata from multiple datasets.

A. Example Embodiments of Data Flows

At its base, the invention described herein is designed to enable disparate users with different data needs to find datasets of value to their processes. Datasets here refer to collections of related sets of information composed of separate elements that can be manipulated by a computer. Datasets as represented here in the example embodiment can also contain data representing any domain of interest, any geographical or temporal frame, any technical or licensing parameters of note, and any other characteristics of import to a community of users.

Figure 2:
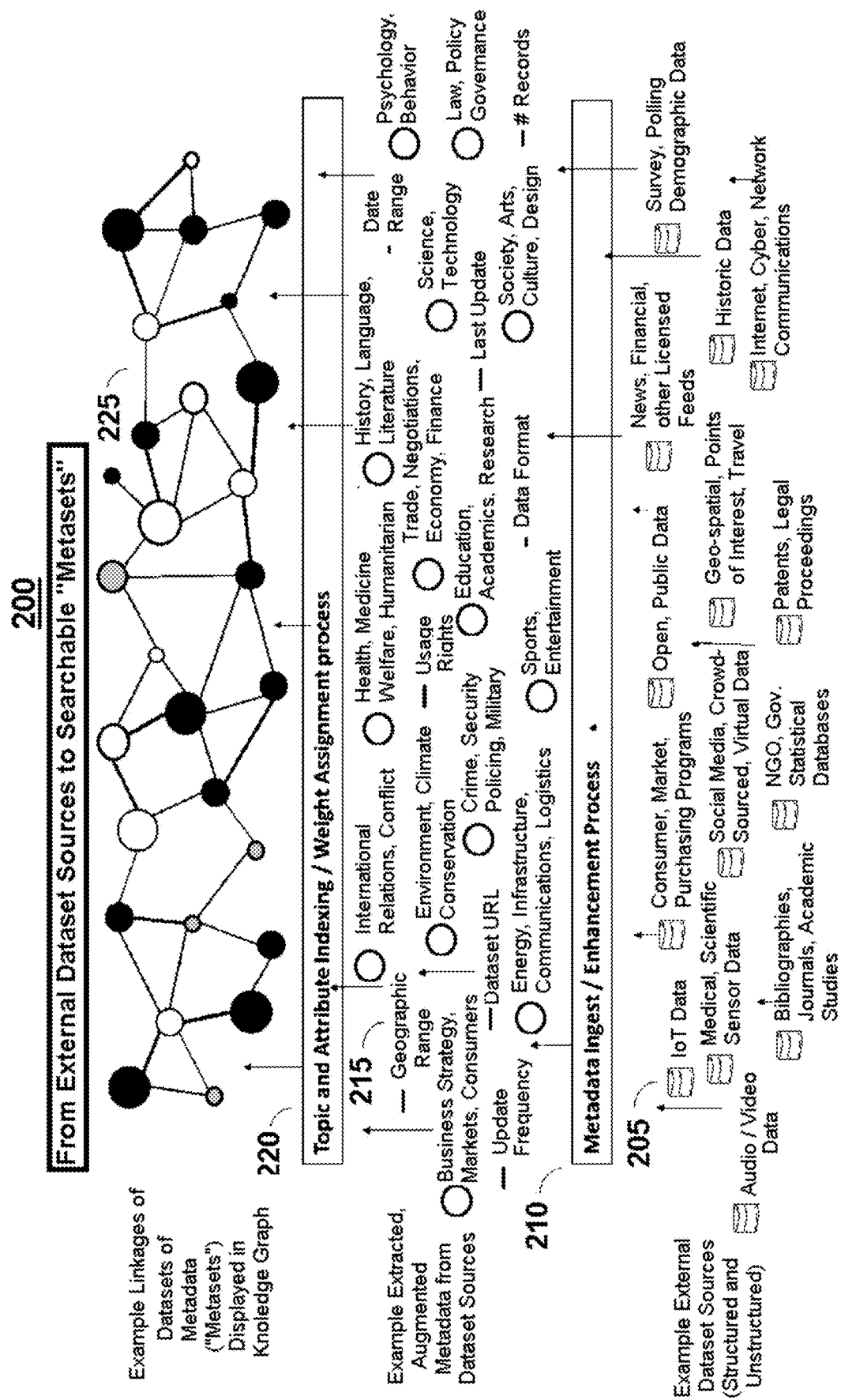
FIG. 2 shows a simplified process diagram of how example data sources are transformed into example extracted metadata, which are in turn displayed as example metaset nodes with attribute linkages between datasets, according to an example embodiment.

FIG. 2 describes how data on datasets flows 200 through and fuels the core functions of the invention described herein. Data in the form of metadata—here defined as specific information that gives information about the dataset—is used to fuel the invention's systems, methods, and processes. Each set of dataset metadata, referred to as "metasets" herein, consists of metadata information in the form of attributes that describe key dataset characteristics of value to users.

Value in this context is derived from dataset attributes, or features, which may include the quality of the dataset, its relevance to the user in terms of content, topic or subject matter, geographic and temporal reference points, its technical properties, its licensing restrictions, its overall cost in terms of usage fees and time needed to prepare data for ingest into a chosen analytic process, and other features of relevance, according to an example embodiment.

The data related to a dataset remains stored at the data source and managed by the data owner. A link to source data from datasets may be made available to the user through the invention's user interface via URL, API, or other means to provide a data feed or data pipeline from the data source to the user, according to an example embodiment and subject to agreed-upon licensing and other data access terms.

Metasets can be ingested and enhanced 210 from any data source 205 accessible from a computer network. Metasets may reflect data held in open and publicly sourced datasets, government sourced datasets, library or academic datasets, privately sourced datasets, datasets sourced by data vendors, datasets sourced and maintained by users or administrators of the invention, or other sourced datasets, according to an example embodiment. Dataset content may include any topic or subject and any geospatial, temporal, or technical specificity of interest to users, according to an example embodiment. Datasets may be available in any and/or multiple structured, semi-structured, or unstructured formats—including but not limited to spreadsheet, database, or data feed formats, geospatial file formats, sensor formats, video or audio formats, imagery and visual formats, text or other computer accessible formats, according to an example embodiment.

Within the system, dataset metadata provided by the data owner—including dataset relevant information such as dataset name, dataset description, data format, dataset licensing restrictions, URLs, APIs or other means of accessing the dataset, and any other dataset information—is ingested and methodically enhanced 210 with additional system-relevant metadata that includes dataset content and technical attributes not available in the data source metadata. The invention indexes and weighs 220 the extracted and enhanced metasets 215 so they can be displayed in the context of other indexed and weighted metasets available within the system application. The system uses the database of indexed and weighted metasets to generate search query relevant knowledge graphs 225 and alternate displays within the user interface, according to an example embodiment. Users interface with multiple, related metaset entities in the form of links and nodes across system displays, including in knowledge graphs, geospatial maps, timelines, and within the context of other statistically relevant sorting functions available within the system. Linked metaset attributes are in turn used to enable multiple processes and functions within the system as described in further detail below, according to an example embodiment.

B. Example Embodiments of Processes to Identify and Verify Data Sources

Figure 3:
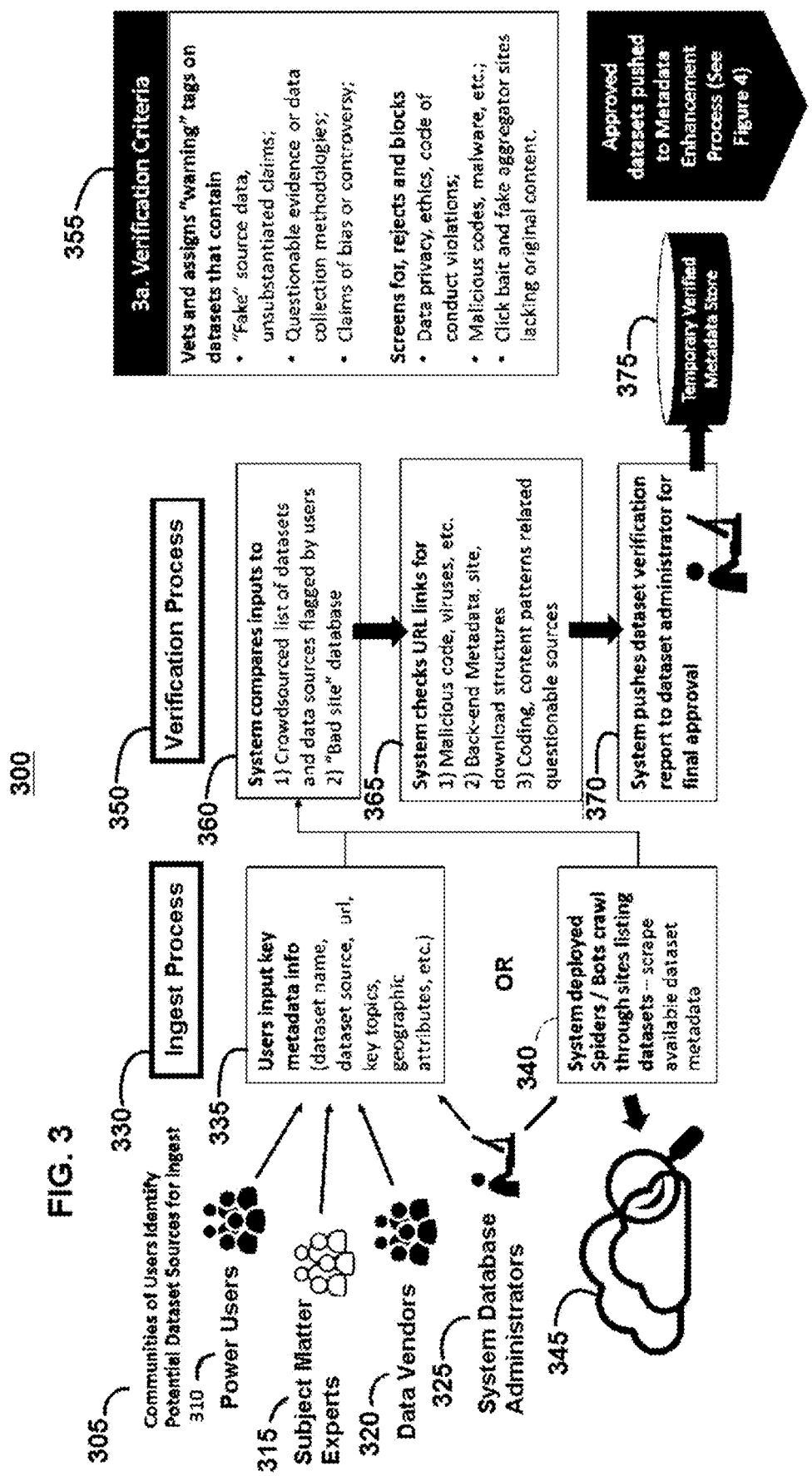
FIG. 3 shows a simplified process diagram for identifying and verifying datasets from external data sources before they are enhanced and displayed within the invention, according to an example embodiment.

FIG. 3 illustrates the methods and processes that are used to identify and verify datasets 300 before dataset metadata is fully ingested into the system described herein, according to an example embodiment. Critical to the overall integrity of the system, the process helps to ensure that dataset metadata loaded into the system leads users back to datasets that are relevant, authentic, legitimate, and devoid of malware, viruses, and/or any other versions of malicious code.

Candidate datasets identified as potential sources for metadata extraction and indexing within the invention can come from anywhere. They can be identified as potential new candidates by system users, data vendors or others 305 who are interested in having datasets featured within the invention, during automated scrapes of web sites 345, or by any other means. Once identified, system vetted users—such as Power Users 310, Subject Matter Experts 315, Data Vendors 320, or System/Database Administrators 325—who have received training in dataset metadata ingest load basic metadata into the system.

Users input basic metadata 335 available at the data source individually, by batch via API, or via other system approved data input techniques. Metadata may include dataset name, dataset source URL, available dataset formats, topic or subject matter tags, geospatial and temporal information, number of dataset records, licensing information and other commonly available metadata, according to an example embodiment. The system may also automatically collect available dataset metadata from scraping mechanisms such as system deployed bots and spiders 340, according to an example embodiment.

Once uploaded, the system verification process 350 compares the metasets of unverified dataset metadata held in a temporary data store 375 to the most recently updated version of the system's crowdsourced index 360 of datasets and data sources that have already been flagged by users or system administrators as "bad" or as needing a dataset "warning". The system also compares the temporarily held metasets to the system's updated list of known bad IP and URL sites compiled and maintained by external sources. Datasets, IP addresses, and URLs that have been previously associated with verified claims of "fake" source data, unsubstantiated evidence or data claims, questionable evidence or data collection methodologies, concerns over bias, or other controversies are tagged with "warning" tags for display in the system's user interface. "Bad" datasets 355—defined as: 1) violating the system's data privacy, ethics, or code of conduct standards; 2) containing malware, Trojans or other malicious code designed to do harm to the system or its users; or 3) identified as fake aggregator, "click bait", or other advertising oriented sites lacking original content—are tagged, deleted and blocked from further processing within the system, according to an example embodiment.

In a second verification process 365, candidate data source sites, URLs, metadata, available code, and data samples may also be checked for known and emerging security vulnerabilities and for compliance with existing and emerging cybersecurity standards such as the NIST Cybersecurity framework, TC CYBER, ISO 27001, ISO 27002, among others, according to an example embodiment.

The system then pushes a verification process results report to System or Database Administrators for review and anomaly resolution. Once authenticated and approved, the metasets are ready for full ingest into the invention for further processing as evidenced in the steps below, according to an example embodiment.

C. Example Embodiments of Processes for Enhancing Metadata

Once verified, the invention pushes the metasets through an enhancement process 400 to de-dupe and normalize metasets and their content using processes familiar to those versed in the art. The system first uses Natural Language Processing or other matching algorithms 405 based on metadata categories 420 to analyze and compare the incoming metasets 375 to those already stored within the system's databases of metasets 410, according to an example embodiment. The system then displays identical and potential matches to the user for review and resolution. Topic or subject tags from deduped metaset files 425 are standardized and compared to files in the Metaset Topic Database 430. The system then provides users with optional, popular additional topic or subject tags based on prior user tags and thesaurus-based matches 435. The system then compares and normalizes attribution tags from the Metaset Attribution Database 445 and provides the user with additional attribution tags for consideration 450. The user reviews potential duplicates, topic and attribution tags and inputs choices 455. Anomalies are pushed to the system administrator for final resolution 460. Metasets are then stored in the system's Enhanced Metaset Database 465 in preparation for indexing, according to an example embodiment.

D. Example Embodiments of Processes for Indexing, Weighting, and Assuring Quality of Metasets FIG. 5 outlines an embodiment of the system's indexing, weighting and cleansing process. This process enables the system's capacity to provide metaset results that are most relevant to a user's dataset search parameters as well as additional system functions related to analyzing datasets based on their linked attributes, as described in greater detail in subsequent sections.

In this process, enhanced metasets 465 are indexed to the system's existing network of metasets 505 that have already been linked by common metadata attributes. To enable semantic linking between attributes, the system uses a two-step Natural Language Processing (NLP) based subject and topic indexing method 510. Here, each enhanced metaset is indexed to other metasets 515 by commonly linked semantic attributes—such as those found within thesauri or within domain specific taxonomies, ontologies, topic maps or other forms of domain specific meta maps available to, or developed by those familiar with the art. Metaset indexing is further extended by a hybrid approach that uses collaboratively filtered recommendations based on system usage and content-based recommendations derived from subject matter expert knowledge to semantically link metaset attributes between disparate domains of interest, according to an example embodiment.

Figure 5A:
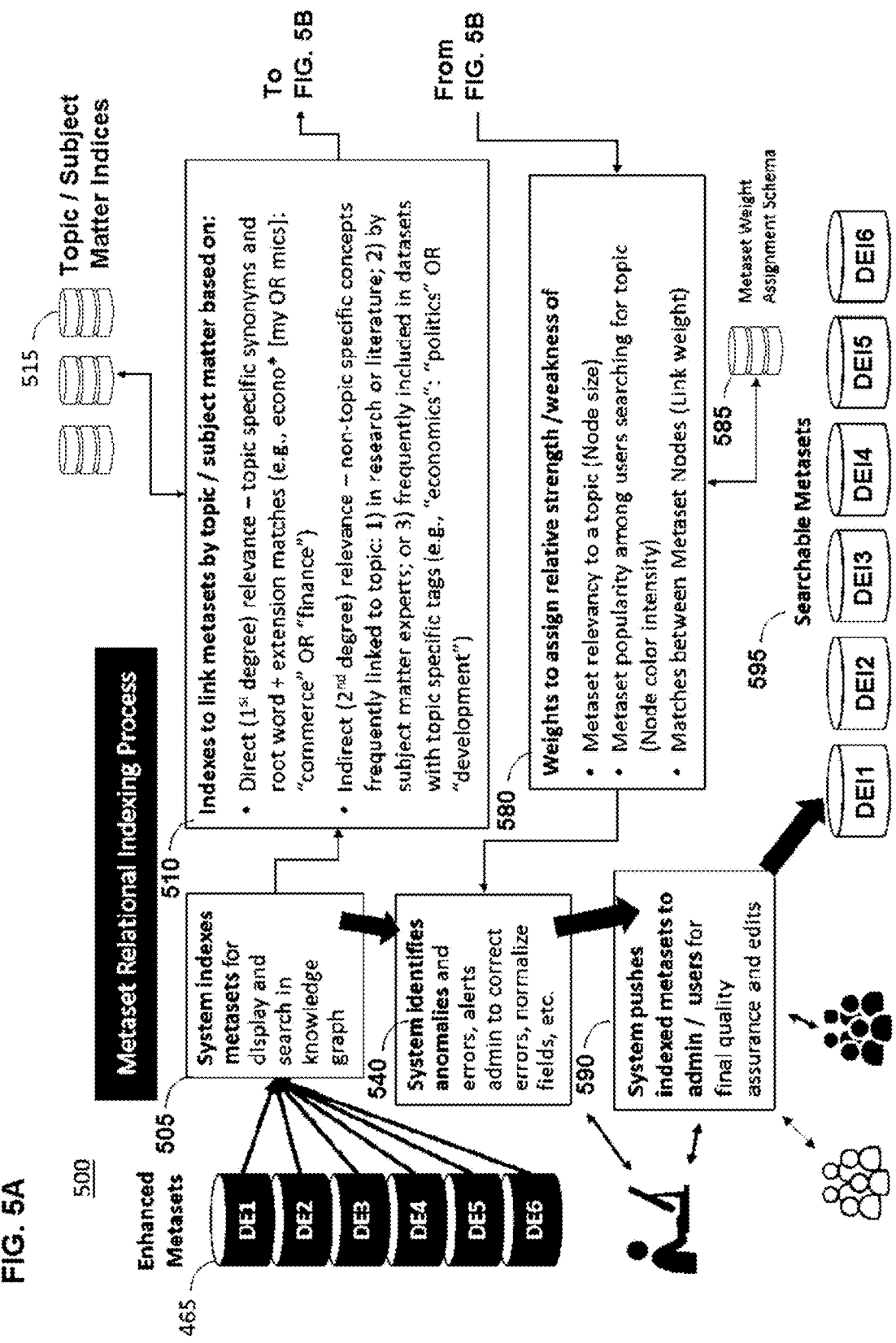
FIG. 5A shows a simplified process diagram of a metaset indexing, weighting and quality assurance process that prepares metasets for display in the system's knowledge graph environment, according to an example embodiment.

FIG. 5a provides an example embodiment of overlaps between metaset content attributes tags. Here, a subject tag such as "Elections" 520 might be indexed to direct thesaurus 516 concepts such as "ballots", "referendum", "vote", etc. 522. Extended mapping 518 might also link "Elections" to concepts such as "voter registration", "political parties", or "campaign financing" 524 that a subject matter expert would immediately recognize as relevant to the study of the subject of "elections", according to an example embodiment. In another example embodiment of indexed attributes, a search related to "Economics" 526 might bring back direct metasets results related to "Finance", "Trade", or "Markets" attributes and extended metaset results related to "Labor", "Politics", or "Agriculture". Likewise, searching for "Development" 528 related datasets, might result in datasets linked by direct attributes such as "growth" or extended attributes such as "Infrastructure", according to an example embodiment.

Extended semantic linking might also result in the discovery of linkages and topic clusters between topic maps. For example, "Elections" 520 tags linked by subject matter experts to "Legislative Districts" might in turn be linked to a cluster of topic tags related to government or "administration" 530, which in turn might lead to metaset information related to "Development" 528, according to an example embodiment. In another embodiment, linking metasets and topic clusters such as those related to "Community" and "Labor" 532 or "Agriculture" and "Environment" might result in more contextual data relationship between "Economics" 526 and "Development" 528, according to an example embodiment. Such types of linked results may enable system users without specific subject matter expertise in an embodied area to find multiple datasets that provide greater subject matter context for research and analysis.

In FIG. 500, extended semantic links are also used in conjunction with standard indexing processes familiar to those versed in the art to relate metasets by other key metadata attributes within the system 535. Enhanced metasets are linked geographically to each other by a combination of common geographical indices, such as gazetteer files, latitudes and longitudes, and other common geo-coordinate indices as well as extended indices of semantically based geographical reference points available in the systems metadata attribute indices 540.

The metadata attribute indices also link metasets to each other with temporal metadata frames based on multiple temporal attributes, including but not limited to the date the dataset was last updated at the data source, the range of dates covered in the dataset content, or the date the metaset was last accessed, among other embodiments. Temporal frames may in turn be extended by semantically based time frames such as "21$^{st}$ Century", "World War II", or "44$^{th}$ President", according to an example embodiment.

Metasets are also linked to each other based on matches of structured metadata attributes within the system that provide additional information about key technical and data management consideration of import to users. These may include but are not limited to attributes such as available dataset formats, dataset ownership, intellectual property and licensing information, dataset pricing, dataset update frequency, and other dataset metadata of relevance. Metasets are also linked to each other based on matches between physical properties of the datasets located at the data source. Metadata attribute matches in this embodiment may include mappings to matches in the number columns and rows within the dataset, column headers, data types, data structures, cell content types, and other technical information pertinent to users looking to combine multiple datasets.

Figure 5B:
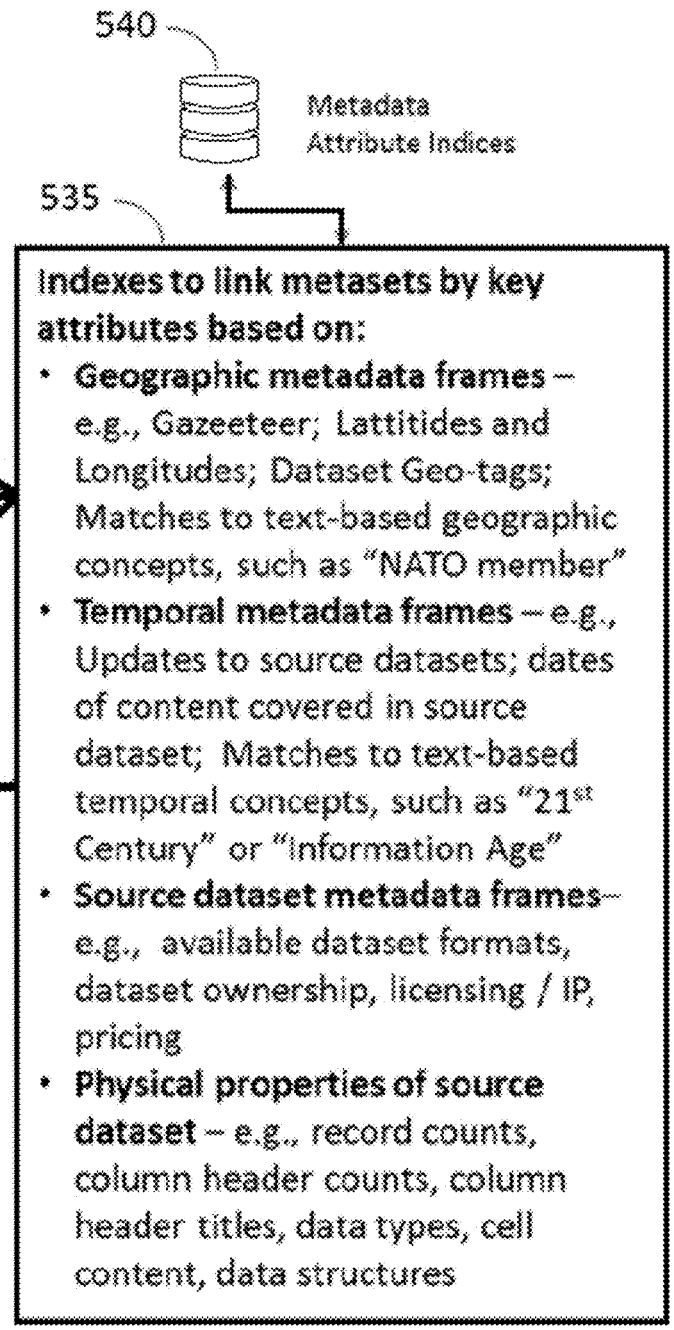
FIG. 5B shows an example visual mapping of how overlapping topics and subjects attributes can link disparate metasets together within the invention, according to an example embodiment.
Figure 5C:
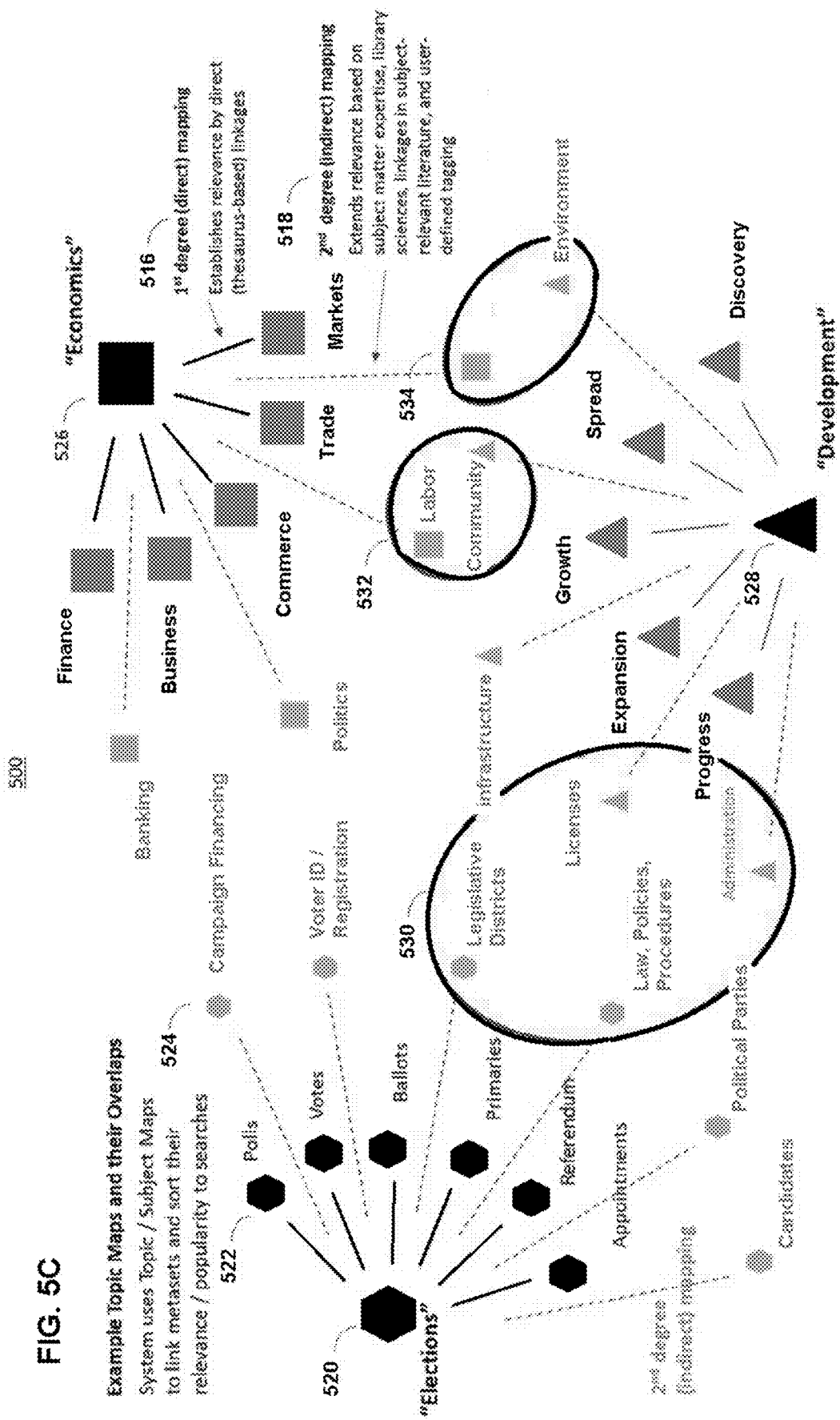
FIG. 5C continues to show an example visual mapping of how overlapping geographical, temporal, metadata, and dataset property attributes can link disparate metasets together within the invention, according to an example embodiment.
Figure 5D:
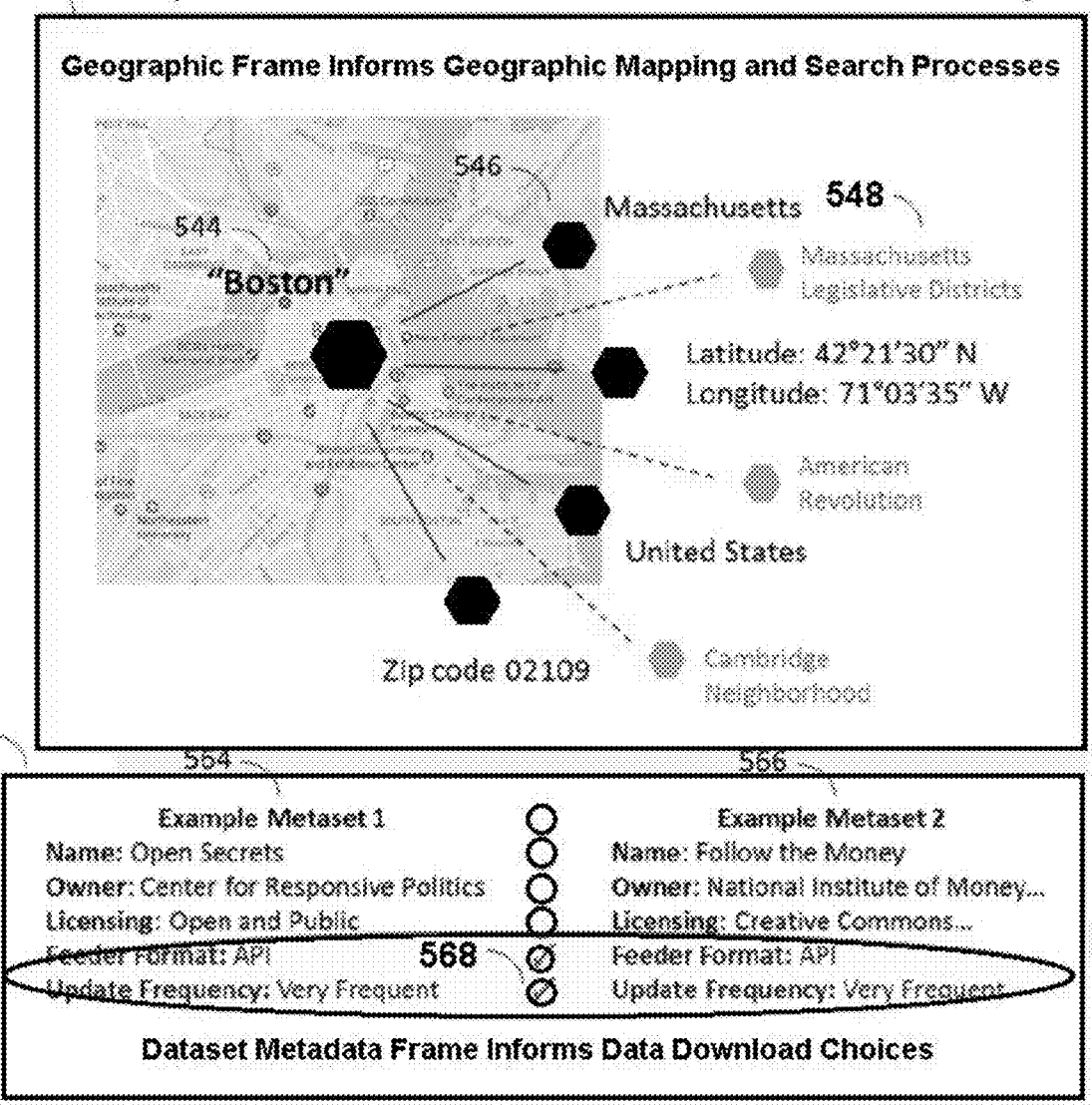
FIG. 5D shows a continuation of the example visual mapping of how overlapping geographical, temporal, metadata, and dataset property attributes can link disparate metasets together within the invention, according to an example embodiment.
Figure 5E:
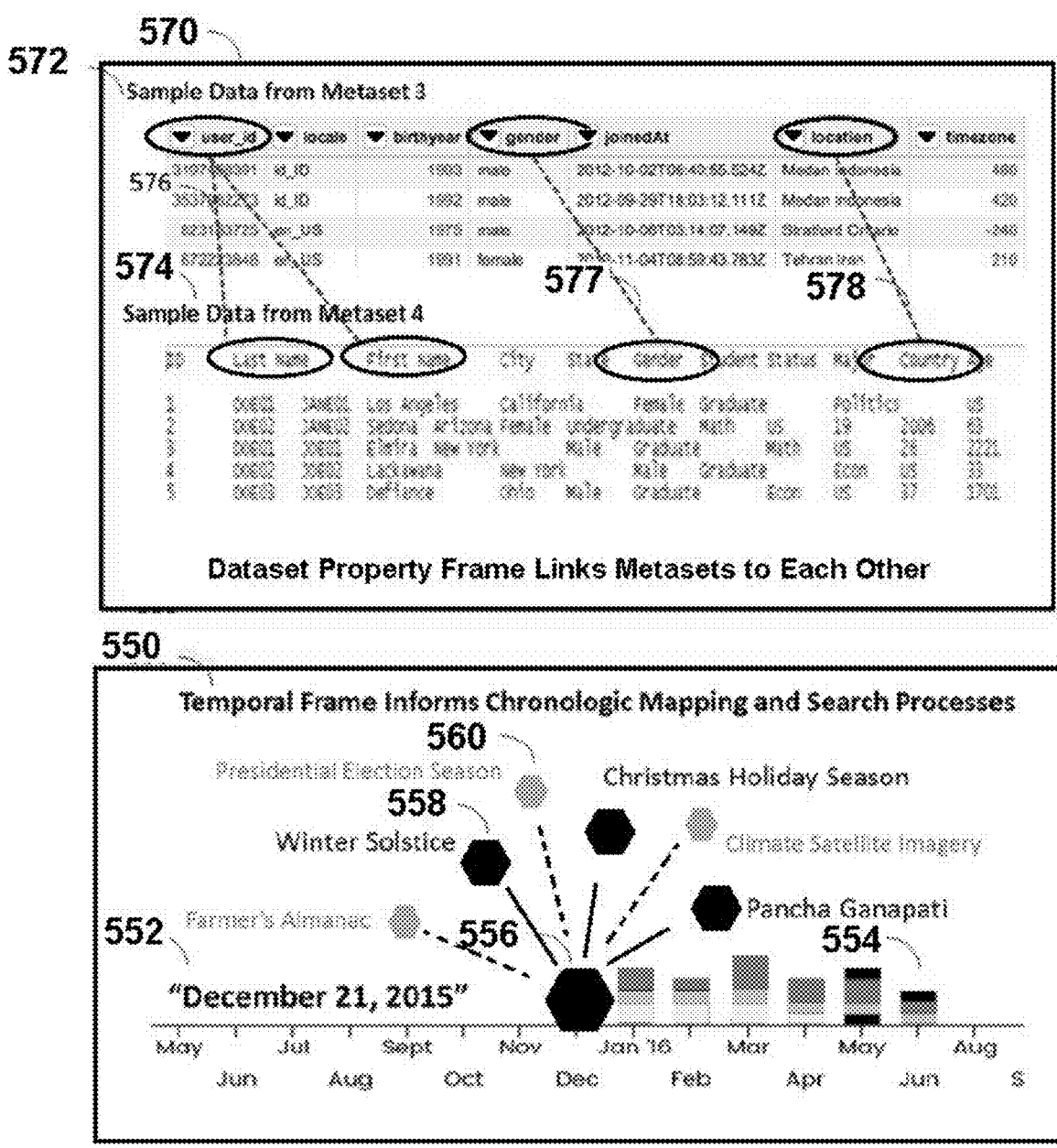
FIG. 5E shows a continuation of the example of visual mapping attributes.

FIG. 5b provides examples of how additional attributes related to geographical, temporal metadata as well as dataset metadata and dataset properties are framed within the system. An example embodiment of a geographic frame 542 shows how the system might index geographical matches based on names such as "Boston" 544, "Massachusetts", or "United States" or with latitude and longitude information, zip codes, or with other geographical points of interest on a geographic map 546. Extended geographic indexing might also include "Boston" as a point of interest within a semantically based search for datasets with content on the "American Revolution" or "Massachusetts Legislative Districts", according to an example embodiment.

Temporal frames 550 might likewise enable the indexing of metasets that share chronologically related attributes. For example, a date specific search 552 might be mapped on a timeline 554 with other related metasets. Temporally related metasets might be expressed in terms of the dates themselves or in terms of semantic linkages, such as "Christmas holiday season" or "Winter Solstice" in which the date is directly inferred 558. Extended temporal attributes might also index metasets based on additional inferred links, such as the date being part of a "Presidential Election Season" 560, according to an example embodiment.

Dataset metadata frames 562 and property frames 572, 574 enable the system to directly link and match metasets based on technical characteristics that may affect the implementation or management of data driven projects. For example, matching metasets based on Metadata frames, such as information about the frequency of updates, licensing issues, etc. 568 or on dataset property frames such as where data set columns contain similar data for analysis and merging 576, 577, 578 may produce results that allow the user to rapidly determine which datasets match their level of technical expertise, budget restrictions, content needs, or any other technical considerations important to their project, according to an example embodiment.

In FIG. 500, the system assigns weights 580 to determine which search related metasets results are returned. The system weights the results to determine the look of the display node based on the proportion of subject matter experts/power users who recommended the dataset as related to the query topic, and on the number of times that prior related search queries resulted in direct clicks through to the metaset data card. The system also uses the weighting schema 585 to separately determine and display the popularity of a dataset based on weighted count of usage statistics. The system further uses the number of attribute matches between metaset nodes to determine the weight of the link, according to an example embodiment.

Once weights are assigned, the system alerts system and database administrators to anomalies and errors for resolution and normalization 540 to assure that subject-predicate-object relationships matching metaset attributes to each other are consistent with the system's library science based classification standards. The system then pushes the indexed, searchable metasets back to the metaset creator—an approved subject matter expert, power user, data vendor, or data administrator—for a final quality assurance and editing process 590. System administrators and users review the metaset information, make changes or further enhancements as appropriate, and re-submit the metaset for indexing. Once errors are resolved and edits finalized 455, the system stores the searchable metasets in its searchable metaset data stores 465, according to an example embodiment.

E. Example Embodiments of Search-Based Displays of Metasets in Knowledge Graphs

FIG. 600 illustrates how the system uses the indexed metasets and weighting schema to display search results in the system's UX/UI, according to an example embodiment. Once a user initiates a search 630, the system uses different techniques such as keyword concept matching, natural language, fuzzy logic, fuzzy concept processing, n-gram, or other more advanced processing technique to query the searchable metaset database 595 and bring back related, relevant, and popular metasets results. It should be noted that these techniques may include the use of keyword, Boolean, semantic index searches, n-gram, as well as other techniques known to those familiar with the art. The system displays the top ranked or most recent metasets in a link and node based knowledge graph that visualizes metaset relevancy, metaset popularity, and matches between metaset attributes based on graphical, technical, or temporal attributes using visualization features such as, but not limited to, the size, shape, or color of nodes 605 and links 620, according to an example embodiment. In this example, metasets that are weighted as relevant based on any combination of data curator, SME, or power user tags and prior search queries of the metaset are represented by the size of the circle 610. The larger the circle, the more relevant the metaset is to the query. Likewise, metaset popularity in this example is represented by the intensity of the color of the node 615 as determined by a variety of usage statistics such as those listed in the example. The more that users have interacted with a metaset card, the greater the intensity of the node color. Link thickness in this example embodiment is determined by the number of shared attributes between metasets 625. The more attributes that metasets share, the thicker the link.

Figure 6A:
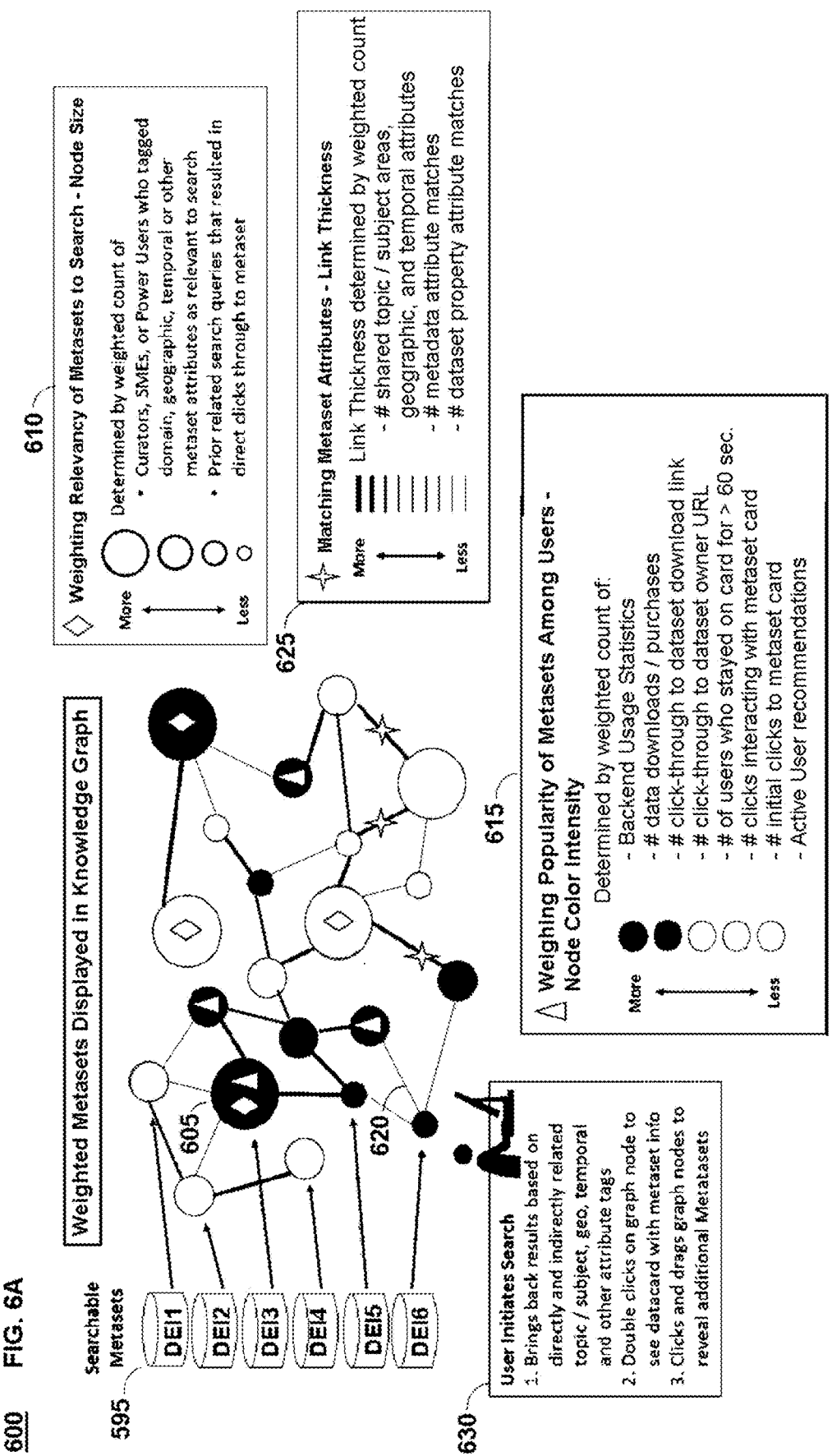
FIG. 6A shows an example knowledge graph display of linked metasets returned from a search as well as the weighting scales used to determine which metasets are brought back as relevant to a search, according to an example embodiment.
Figure 6B:
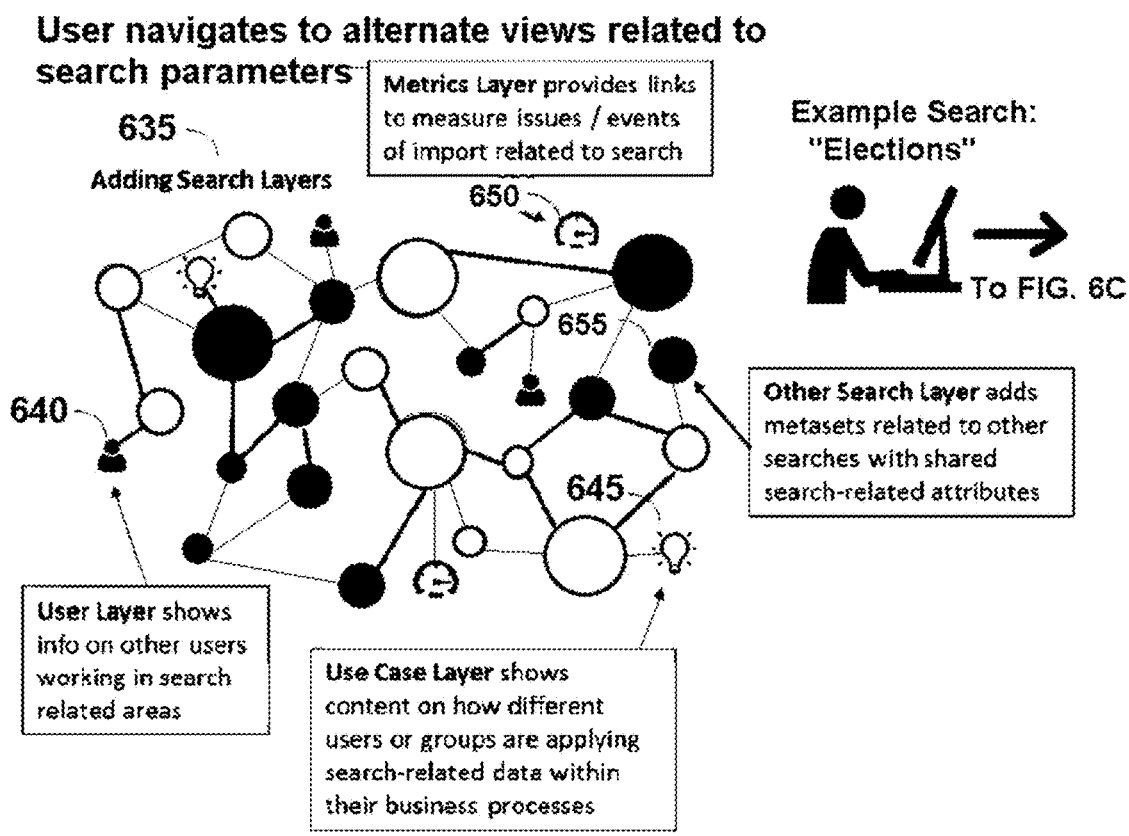
FIG. 6B shows examples of alternative knowledge graph and metadata card displays—including different ways to sort metasets—that may be available in the system, according to an example embodiment.
Figure 6C:
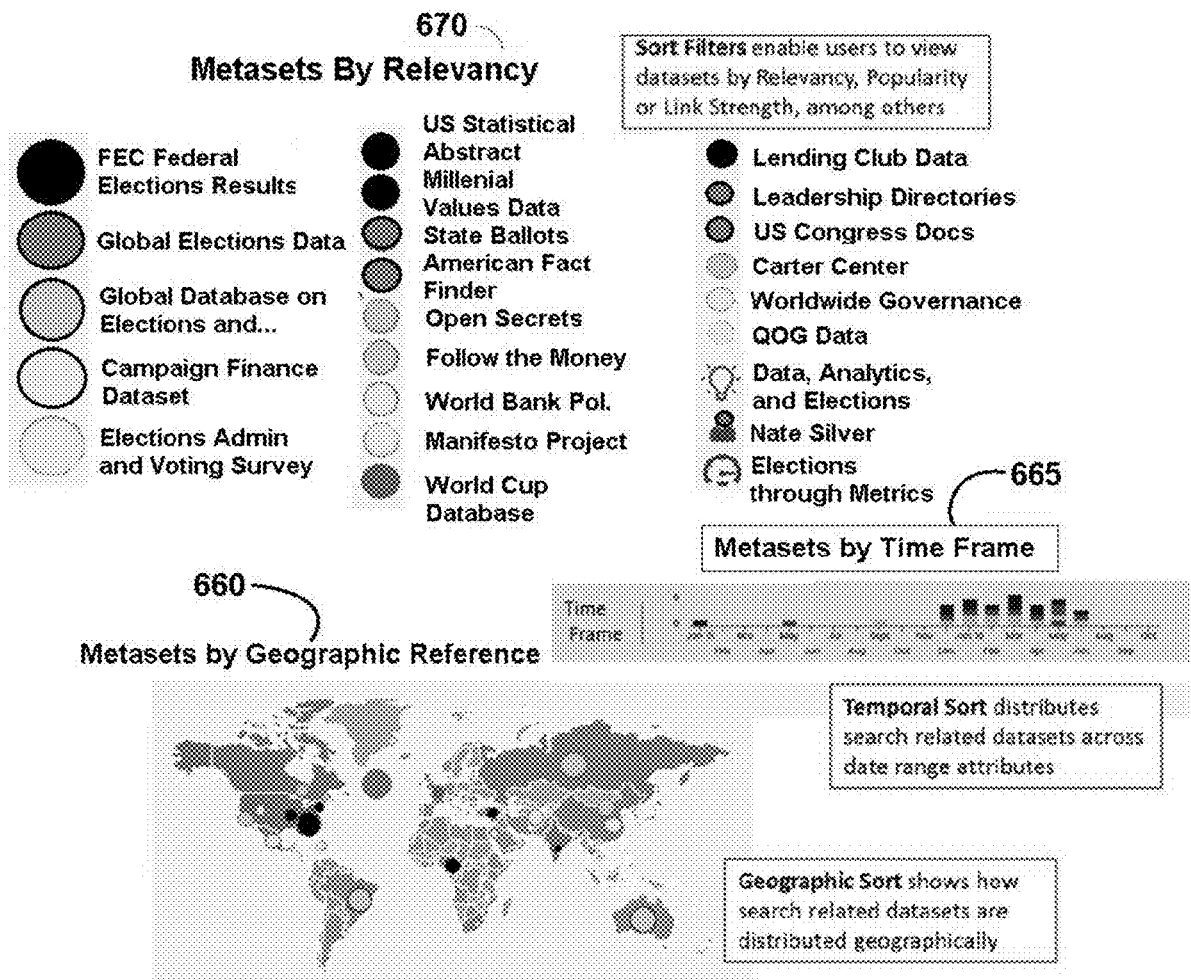
FIG. 6C shows metasets by relevancy and metasets by geographic reference.

FIG. 6a provides examples of alternate metaset visualizations that may be available within the system UX/UI environment, according to an example embodiment. In one embodiment, the user may add layers 635 to the search results to find additional content. For example, a user layer may provide the user with links to the public user pages of other users who have interacted with metaset results 640. In another embodiment, users may add a layer that allows them to identify and get more information about metrics and measurements used with metasets to analyze outputs 650. Users may also layer in information and posting about business process use cases that relate to metasets in a separate example 645. Additionally, users may be able to layer in results to separate search queries to examine whether any links exist between attributes 655.

Users may also choose to visually display search results through any number of alternate data visualizations available to those familiar with the art. Such visualizations may include any algorithmically relevant sorting displays such as sorting by relevancy 670, as exampled in one embodiment. Other data visualization may include displaying metasets by geographic 660 or temporal references 665, or other visual display that are suited to providing users with additional capability to find and discover metasets of relevance to their searches, according to an example embodiment.

F. Example Embodiments for Exploring and Combining Datasets in Knowledge Graphs FIG. 700 illustrates how users navigate through the system's UX/UI to explore dataset content from varying displays of metaset nodes. In the example embodiment of a knowledge graph displaying results related to "elections" shown here, a user might roll over a metaset node to reveal key information about the dataset 705 such as the dataset name, its geographical coverage, a short description of its contents, or other key metadata information available on metaset data card, according to an example embodiment. User might also roll over the links between datasets to reveal key shared attributes 715. Double clicking on a metaset may link the user to the content of a metaset data card 710, which may include all of the enhanced metaset information the dataset as well as links to the data associated with the metaset that is available at the data source 720, according to an example embodiment.

Figure 7A:
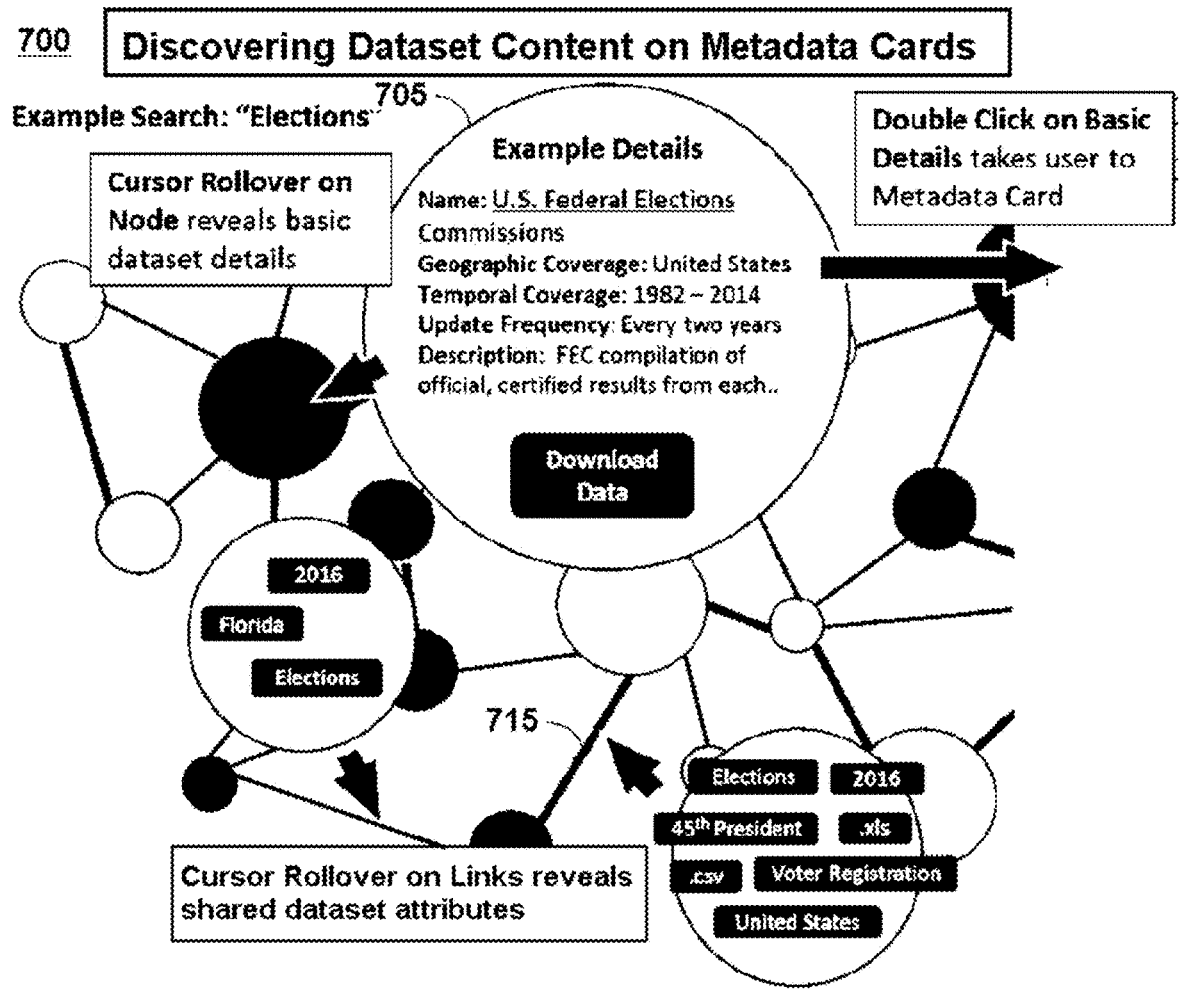
FIG. 7A shows an example knowledge graph display of user interaction that will reveal additional dataset and metadata information from knowledge graph nodes and links, including data card details, according to an example embodiment.
Figure 7B:
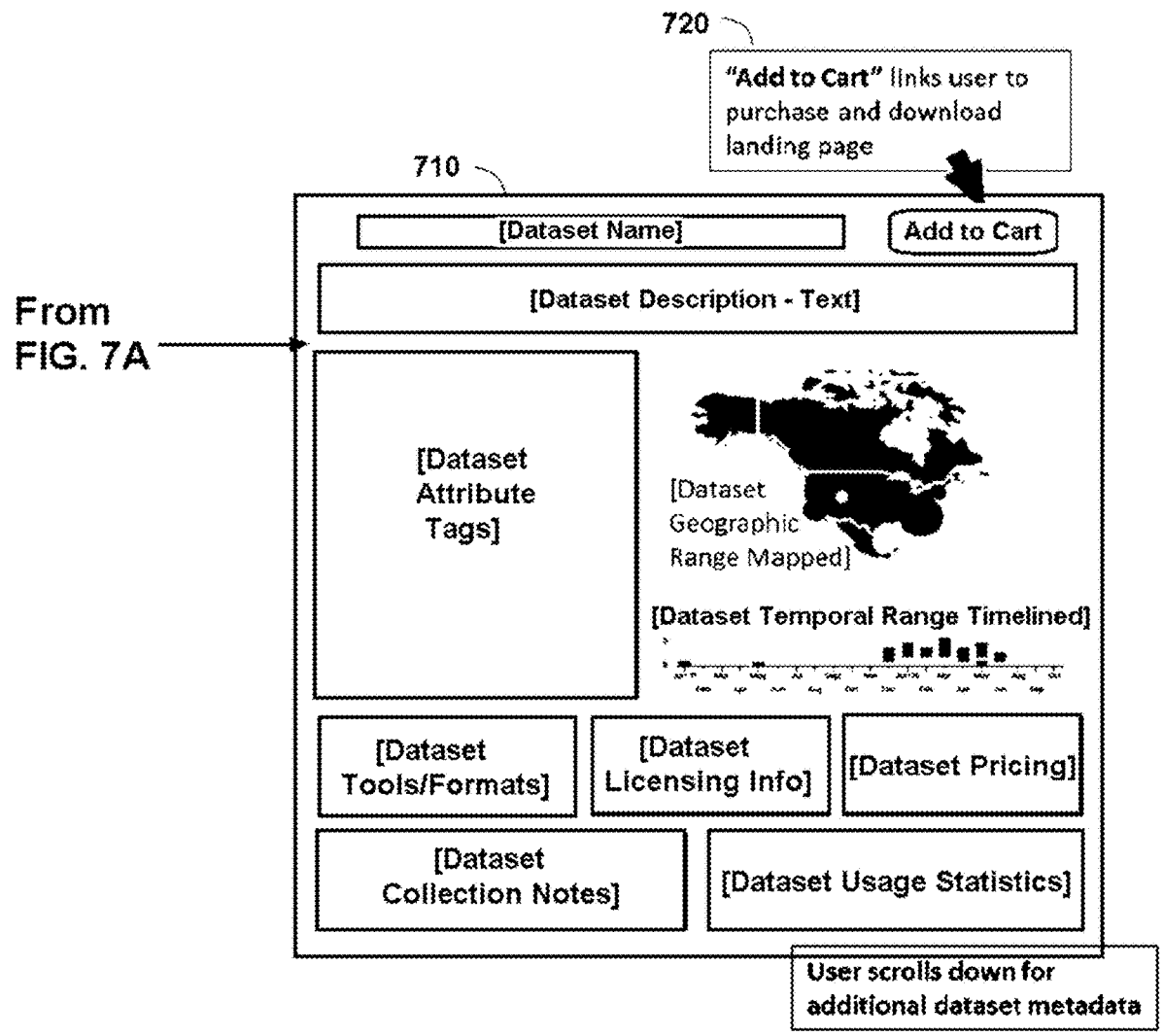
FIG. 7B shows a continuation of the example knowledge graph display of user interaction that will reveal additional dataset and metadata information from knowledge graph nodes and links, including data card details, according to an example embodiment.
Figure 7D:
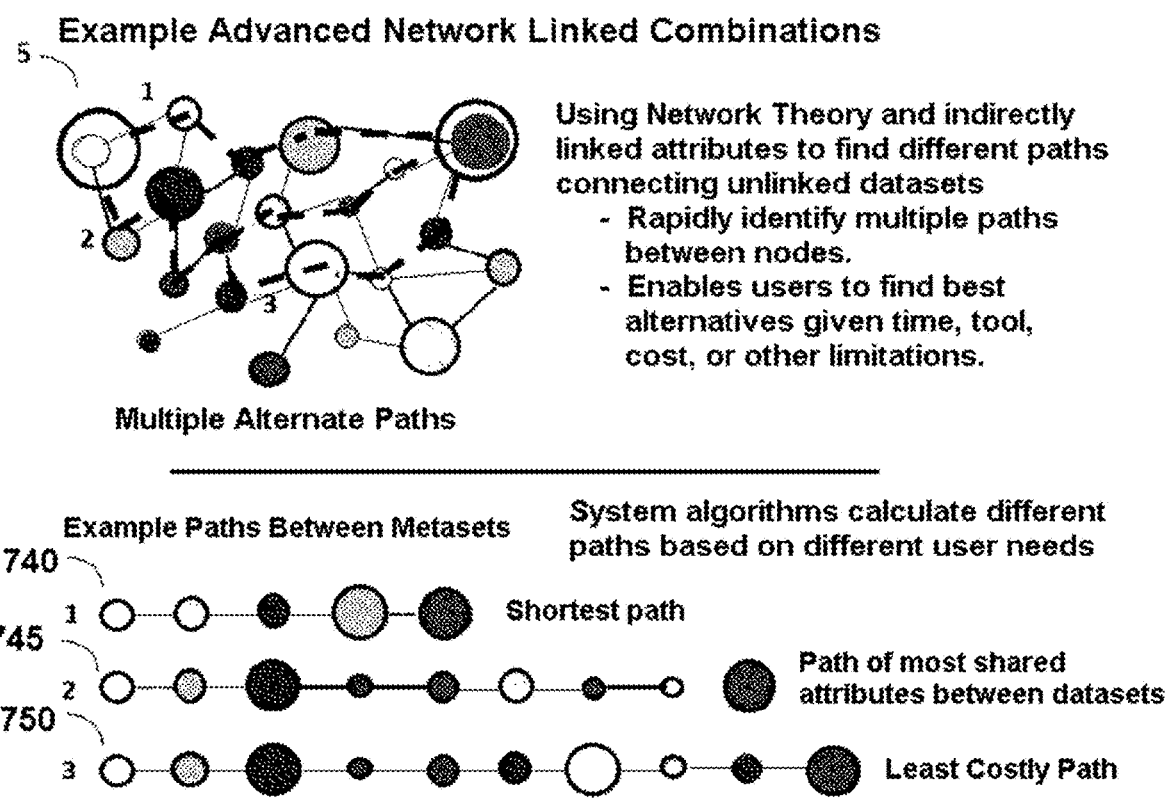
FIG. 7D shows a continuation of the series of simplified process diagrams detailing how a user could choose different combinations of metasets based on shared direct or indirect attribute linkages from knowledge graph visualizations, according to an example embodiment.
Figure 8A:
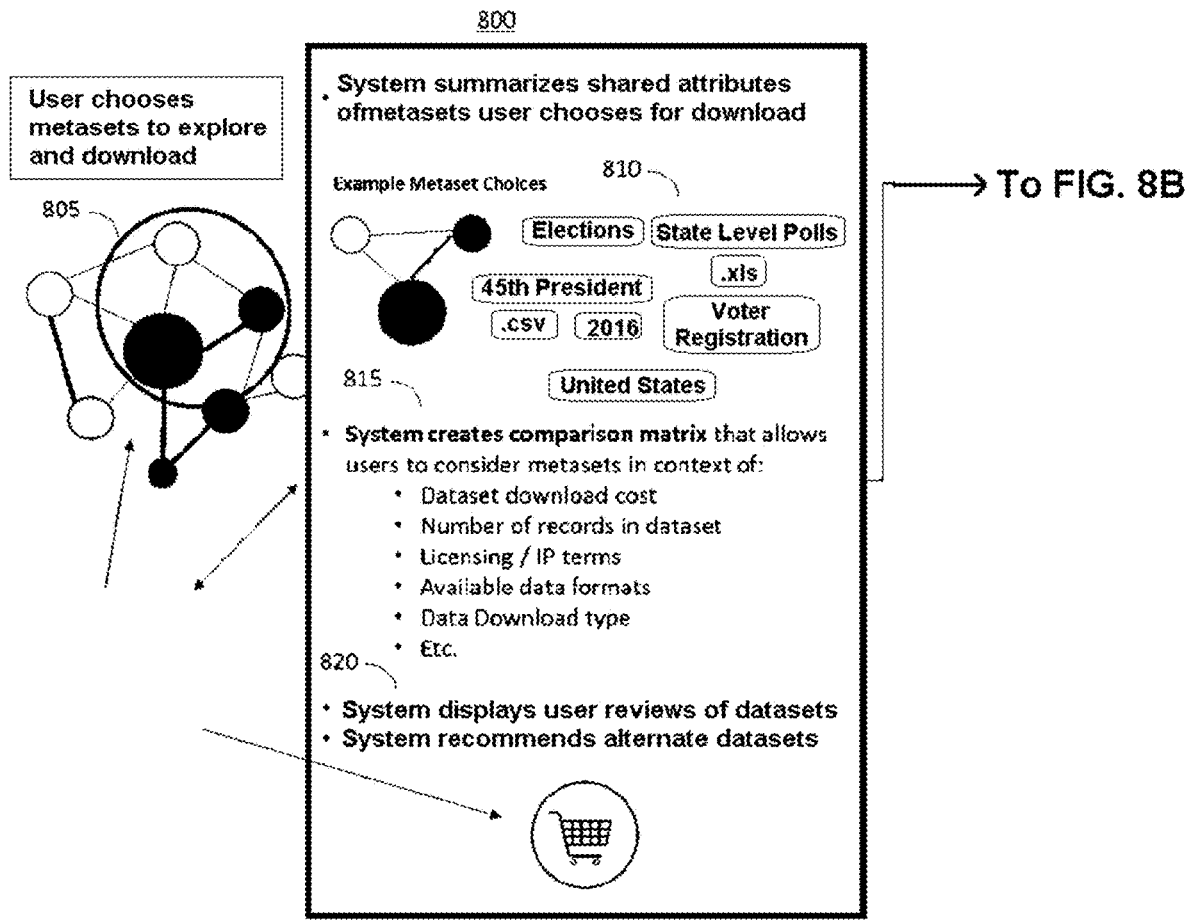
FIG. 8A shows a simplified process diagram of how a user may compare and contrast datasets within an acquisition matrix before final decision making, according to an example embodiment.
Figure 8B:
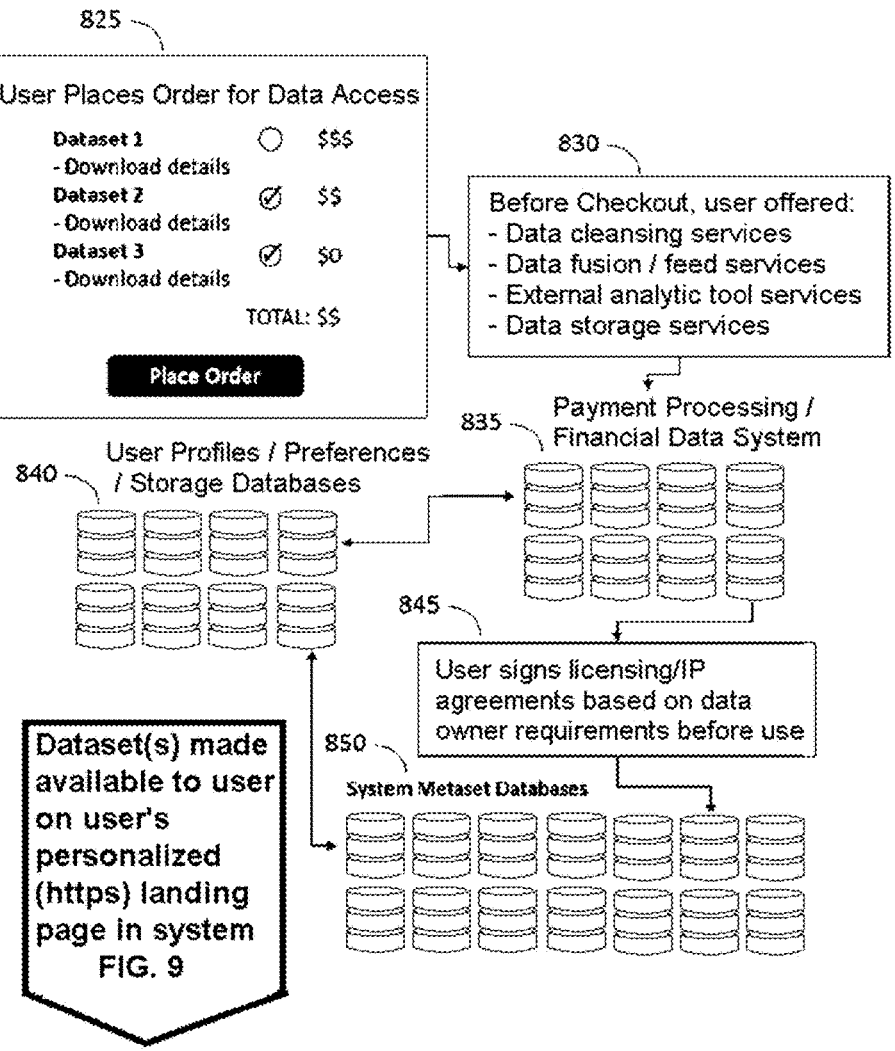
FIG. 8B shows a continuation of the simplified process diagram of how a user may compare and contrast datasets within an acquisition matrix before final decision making, according to an example embodiment.
Figure 9:
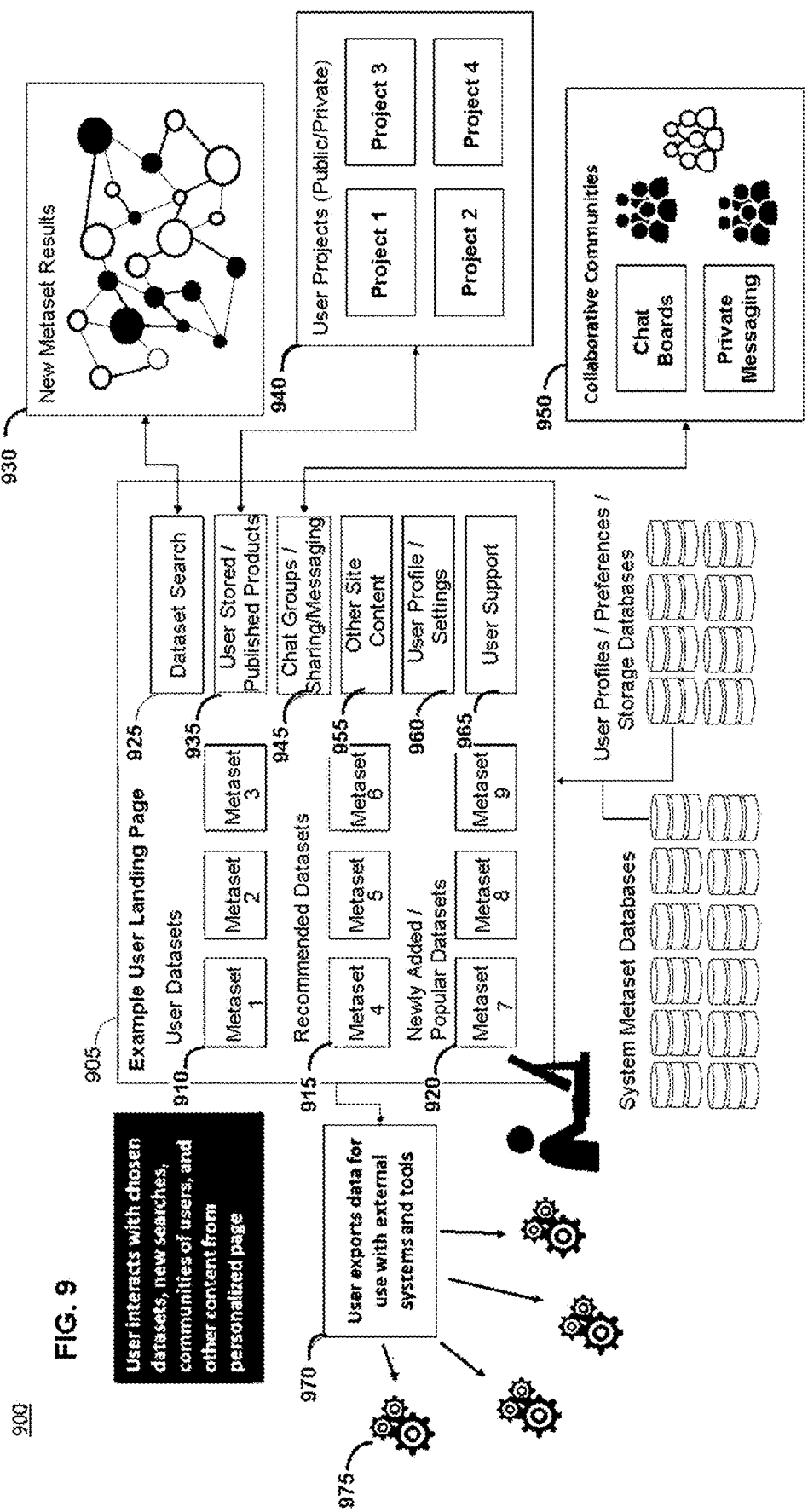
FIG. 9 shows a simplified process diagram of processes and services available to the user from a personalized landing page, according to an example embodiment.

FIG. 7a illustrates example embodiments of how users might group metasets nodes and links to explore how different metaset combinations could help assure more complete and relevant data coverage. The first example embodiment illustrates how users might explore paths between two nodes that have been identified within the system as "popular"—as visually exemplified by the intensity of the node color—or as "relevant"—as visually exemplified by the size of the node—to the user's search query. Such "recommended" 725 combinations could help provide the user with confidence that the data reflects common knowledge to those with experience in the subject of content and is more reliable to use, according to an example embodiment. User may also choose to explore novel metaset paths that incorporate data from less cited (represented herein as smaller nodes) or less used (represented herein as lighter colored nodes) datasets, such as those embodied in the second example 730. Links between metasets serve to help the user identify potential attribute specific search areas and to increase the likelihood of correlations of note, according to an example embodiment.

Using network theory, the system also enables users to look for linking paths between unlinked nodes, enabling user to discover and explore datasets across any linking metadata attributes available within the system 735. This functionality can serve multiple user purposes, including but not limited to identifying different combinations of data that share multiple subject matter or technical attributes, are most cost effective, or work best with the user's suite of analytic tools, or any other factors of importance to the user identified in the system's metadata on datasets, according to an example embodiment.

G. Example Embodiments of Choosing Datasets

FIG. 800 illustrates the embodiment of how system processes may facilitate a user's ability to choose among seemingly similar dataset options before investing resources into any one. In an example embodiment, once a user chooses metasets to explore 805, the system may summarize the shared attributes 810 between the chosen datasets.

The system may also create a confusion matrix 815 that allows users to compare metadata on datasets available in the system—including metadata such as dataset download cost, number of available records, licensing terms, data formats, etc.—to determine the best combination that matches the user's technical skill level, financial resources, time to exploitation limitations, or other key considerations that typically fall into a user's decision making process on whether to use a particular dataset. The comparison matrix may also include an embedded data acquisition calculator, akin to a mortgage calculator, that enables the user to consider the factors that determine the resource and time costs to ETL (Extract, Transform, and Load) a given dataset and prepare it for ingest into the user's analytic tools of choice, according to an example embodiment.

The system may also provide the user with a summary of reviews on the chosen datasets as well as recommendations for other datasets that are similar 820. Upon checkout 825, the system may also offer the user additional data services, including but not limited to data cleansing, data fusion, data feed, data storage, and access to external analytic tools compatible with the user's chosen datasets 830, according to an example embodiment.

User purchases are recorded in the system's secure payment processing applications 835. Security is preferably in place to protect payment processing, including, but not limited to 256 bit, 2048 bit, and SSL encryption to meet common modern bank security measures. This may include the use of other known encryption technologies, including RSA-2048, asymmetric public key encryption, and/or symmetric encryption. Secured payment methods of users and their user profiles 840 are updated to enable to access to the data download interface attached to the system metaset databases 850. Once a user reads and signs all relevant licensing, and data usage and policy agreements 845, they are able to access and download the data from the data owner's externally held data stores, according to an example embodiment.

H. Example Embodiments of Working with Datasets

FIG. 900 provides an example embodiment of how a system user may interact with different functions and processes within the system, and how a user may download user-accessible data to other systems for further processing. Within an embodiment of a personalized landing page 905, a user may view or download data to which they have access 910. A user may also receive recommendations on datasets of interest based on their prior activity with metasets 915 as well as recommendations on newly added or popular metasets with the systems community of users 920. From the landing page, users may also initiate new metaset searches 925 to bring back new result 930 viewable and searchable with the full functionality described herein, according to example embodiments. Users may also store personal projects they produce with data from the system ingested into analytic systems approved for use within the system's interface 935. From this function, users may also keep projects private, share them with the system's community of users, or share URL links with other services and applications outside of the system 940. Users may also access and collaborate with the system's community of users via text messaging 940 or within public or private working group services available within the system 950, view their personal profile and settings 960, or contact system support 965. User may also use their personal landing site to export 970 authorized data from the system to externally located tools, services, or systems 975.

It should be understood that, after the system of the present invention returns results of a search, which may then be filtered or refreshed based on new input criteria, the user is always provided the option to return to his or her original search result set if they do not like or need the filtered result set. As such, any user may always trace his or her way back to the original search with minimal effort.

In short, it should be understood that the present invention includes a method for the organization, relating, and distribution of datasets from multiple sources via a computer comprising: connecting the computer to a metaset database, the metaset database containing datasets of metadata grouped into metasets according to specific criteria; the computer attributing standardized categories to the metasets, forming indexed searchable metasets; a user entering search criteria to a search field disposed on a platform in communication with the searchable metaset database; the computer searching the metaset database for metasets pertaining to the search criteria; the computer displaying identical and potential matches to the user for review in the form of metaset data cards as results; the computer displaying the top ranked or most recent metasets in a link and node-based knowledge graph that visualizes metaset relevancy, metaset popularity, and matches between metaset attributes based on graphical attributes such as the size, shape, and color of nodes and links between nodes; the user licensing at least one selected metaset displayed on the knowledge graph; the knowledge graph digitally displaying one node per matched metaset; and, the knowledge graph digitally displaying at least one node link disposed between nodes.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method for searching for, discovering, and analyzing relationships between datasets across multiple degrees of separation via a computer comprising:

connecting the computer to a knowledge graph database, the graph database containing a collection of datasets of metadata on externally held datasets and data sources, known as "metasets", that are ingested into the computer, enhanced with specialized information on each representative dataset that captures obvious and non-obvious relationships between datasets, and grouped according to specific criteria;

connecting the computer to other databases and attributes used to manage computer services, the attributes selected from the following group: databases containing multiple graph-based metaset indices enhanced with common, less common, or expert knowledge of subject matter, geographic features, temporal features, and technical features, databases containing content relating to user profiles, preferences, recommendations, and interactions with computer features, additional content on datasets, and computer generated metaset recommendations;

connecting the computer to a searchable knowledge graph interface to execute search criteria;

a user entering search criteria into a search field disposed within the searchable knowledge graph interface in communication with the computer's knowledge graph database and other databases and attributes used to manage computer services;

the computer searching and retrieving metaset results from the databases pertaining to the search criteria;

wherein the computer uses graph-based metaset indices on subject matter, geographic, temporal, and technical features to retrieve obvious and non-obvious metasets of relevance to the search criteria;

wherein the computer uses other databases to retrieve additional metasets and related information of relevance to the search criteria, chosen from the group: user profiles, preferences, recommendations, and interactions with computer features, additional dataset information, and computer-generated metadata;

the computer generating and displaying results related to the search criteria as a searchable knowledge graph representation within the knowledge graph interface;

wherein search-related metasets are displayed as nodes and shared attributes between the datasets are represented as connective links in the knowledge graph representation of results;

wherein users explore and interact with the representation of search results within the knowledge graph interface by performing at least one of the following actions: clicking on links, nodes, and other content to add or remove displayed content from the representation, by moving links, nodes, or other content to different positions within the representative display;

wherein the computer executes additional search criteria to refine results and update the display with additional criteria-related results from connected databases, chosen from the group:

to expand results across the knowledge graph representation of results, to narrow results across the knowledge graph representation of results, to add layers of additional content related to the search criteria, and to identify multiple paths of interconnected metasets across multiple degrees of separation;

the computer generating and displaying alternate searchable representations of metasets and content related to the search criteria chosen from the group: ranked list representations, geographical representations, temporal representations, and statistical representations;

the computer executing additional algorithms to find common, uncommon, and novel combinations of datasets of relevance to the search criteria;

the computer generating reports and recommendations related to the search criteria or to user interactions with the search related knowledge graph or additional content; and the computer enabling access to externally held data described in the metaset nodes by methods chosen from the group: links to a datasets URL, APIs, or other licensing or subscription agreements between dataset owners to provide direct access to the externally held data from the computer.

2. The method of claim 1, further comprising: the computer retrieving metasets from databases and generating and displaying a number of metasets that is greater than zero as links and nodes within a searchable knowledge graph:
wherein retrieved metasets are related to the search criteria in at least one of the following ways: by direct matches in natural language terms, by direct matches to shared attributes common to the search criteria, by indirect matches to natural language terms, by shared attributes based on subject matter expert or technical knowledge related to the search criteria, by shared attributes across subject, geographical, temporal, or technical reference graph indices, and by additional criteria that the computer uses to execute graph algorithms or conduct further searches and analysis of metasets.

3. The method of claim 2, further comprising:
the computer retrieving metasets from databases and generating and displaying a searchable knowledge graph link and node visualization of enhanced metasets in response to the search criteria with each node representing a relevant metaset and each link representing the relationship of enhanced metaset attributes between two nodes that reflect common as well as non-obvious expert understanding of how the nodes relate to each other technically, contextually, or substantively, and with different visual representations in the links and nodes representing the returned metasets of relevance to the search criteria.

4. The method of claim 2, further comprising:
the computer retrieving metasets from databases;
the computer generating searchable interactive knowledge graph representations;
the computer displaying the searchable interactive knowledge graph representations;
wherein the searchable interactive knowledge graph representations enable the exploration of individual metaset nodes and the datasets they represent;
wherein the searchable interactive knowledge graph representations enable the exploration of direct links between two metaset nodes representing the common attributes of closely related datasets;
wherein the searchable interactive knowledge graph representations enable the exploration of links and nodes that indirectly link to each other across multiples degrees of separation;
wherein the computer retrieves metasets from databases and displays search related results in response to user interactions expanding or minimizing links and nodes, or augmenting or refining search criteria within the knowledge graph representation;
wherein the computer executes additional graph-based search algorithms to discover novel paths between metaset nodes across multiple degrees of separation; and
wherein the computer executes additional graph-based search algorithms to discover novel paths between metaset nodes across new, non-obvious dataset combinations across non-obvious attributes in response to the search criteria.

5. The method of claim 1, further comprising:
the computer retrieving metasets from databases and generating and displaying an interactive, searchable knowledge graph visualization related to the search criteria that contains executable functions chosen from the group: retrieving metasets from databases, displaying additional existing metaset links and nodes, deleting existing metaset links and nodes, limiting search related attributes, expanding search related attributes, adding metadata related features, deleting metadata related features, and searching for new results using graph algorithms.

6. The method of claim 1, further comprising:
the computer executing knowledge graph-based algorithms to help identify different link and node combinations of metasets with shared attributes across multiple degrees of node separation that, when used together, more completely fulfill search criteria.

7. The method of claim 1, further comprising:
the creation, development, augmentation, and maintenance of semantic and property graph-based indices reflecting common and less common knowledge on subject matter, geographic, temporal, or technical metadata features as well as expert, domain-specific knowledge of geographic, subject matter, temporal or technical metadata reference points not obvious to the casual user to enable the computer to map metaset nodes across shared attributes and add layers of metaset knowledge for more in-depth and informed searches.

8. A method for searching for, discovering, and analyzing datasets that share metadata attributes, are organized in graph databases and other databases and made searchable within a knowledge graph interface that exists on a computer platform and that executes computer functions and enables links and nodes to be followed across multiple degrees of separation to find direct, indirect, or novel individual or combinations of datasets related to search criteria, comprising:
ingesting metadata on externally-held datasets, known as "metasets;"
enhancing the metasets with additional attributes;
organizing and storing descriptive information on the metasets as nodes and metaset attributes that are shared across datasets as links in a searchable graph database;
wherein the process for ingesting and enhancing metadata on externally held datasets to create metasets is standardized ensuring that all metasets stored in the database contain attributes chosen from the group: common descriptors and metadata, less common metadata and specialized metadata developed specifically for use in the computer;
wherein dataset metadata that is ingested describes any dataset or any data source that exists outside of the computer;
wherein metasets representing externally held datasets undergo systematic vetting selected from the following group: verifying dataset ownership, verifying data source ownership, assessing data privacy policies, isolating malicious code, removing malicious code, and identifying known biases affiliated with a dataset before being enhanced;
wherein the process for enhancing metasets is standardized so that metasets contain attributes chosen from the group: common knowledge of a subject matter related to a metaset, geographical references related to a metaset, temporal references related to a metaset, technical specifics related to a metaset, uncommon knowledge of a subject matter, geographical references, temporal references, technical specifics related to a metaset, and specialized knowledge of a subject matter;
wherein standardized metasets are organized into a knowledge graph database that the computer uses to execute search related functions selected from the following group: retrieving metasets relevant to search criteria, displaying search results in an interactive, searchable knowledge graph interface, displaying search results by alternate visualization methods, executing additional algorithms to find multiple, different combinations of datasets relevant to search criteria, and analyzing search results based on user interactions with metasets;

connecting the computer to the graph database of metasets;

connecting the computer to a database of semantic graph-based indices and property graph-based indices;

the computer using the indices to map enhanced metasets across shared attributes and add layers of metaset knowledge for more in-depth and informed searching;

the computer weighing different metasets by connections in directly or indirectly linked attributes, by specific use tags, or by back end usage statistics on prior related searches to determine their relevance to search criteria;

connecting the computer to additional databases that are used to manage other services chosen from the group: generating recommendations of metasets relevant to search criteria, accessing additional content related to search criteria, managing user profiles or preferences, controlling user access, managing computer usage, and generating usage statistics;

a user entering search criteria into a search field disposed within a platform;

the computer using the metaset database, the database of knowledge indices, and additional databases, to retrieve, and generate and display results related to the search criteria as a searchable link and node knowledge graph within the knowledge graph interface;

wherein the computer executes searches for results related to search criteria from keywords, boolean logic, or in natural language expressions;

wherein nodes represent metasets and links represent the attributes shared between two metaset nodes related to search criteria;

wherein the computer retrieves metasets and displays more than zero and that exceed 5,000 metaset results related to search criteria from databases;

wherein the computer determines metaset node appearance using a weighted count of subject matter or technical knowledge of a metaset and of prior search criteria that have resulted in direct clicks through to an externally held dataset;

wherein the computer determines metaset node appearance using a weighted count of back end usage metrics;

wherein the computer determines link appearance by using a number of directly shared attributes between two metaset nodes;

wherein the computer executes functions chosen from the group: bringing up descriptive information on links and nodes, moving links and nodes within the interface, or adding or deleting links and nodes within the search-related knowledge graph;

wherein the computer uses alternate methods to visualize metasets chosen from the group: descriptive details, ranked list representations, geographical representations, temporal representations, or statistical representations;

wherein the computer provides different methods to access metaset-related data directly from the external site where a dataset or data source represented in a metaset resides;

the computer retrieving new metaset results or augmenting existing results from databases to add new or update existing results within a previously-generated search-related knowledge graph;

wherein the computer executes different algorithms to respond to new search criteria, return new results, or expand or narrow search results, the algorithms selected from the following group: random path, graph traversal, weighted graph, breadth first and depth first algorithms;

the computer responding to user interactions within the search-related knowledge graph to execute additional functions that enable metaset discovery and analysis;

wherein connections to a single node within an existing knowledge graph display link directly to other metasets that share similar attributes;

wherein connections across multiple links and nodes within an existing knowledge graph display are followed to explore datasets that are indirectly linked through multiple degrees of node separation;

the computer expanding metaset attribute links and metaset nodes related to search criteria within an existing knowledge graph display to retrieve and display new results not directly related to the original search criteria;

the computer narrowing metaset attribute links and metaset nodes related to search criteria within an existing knowledge graph display to retrieve and display new results not directly related to the original search criteria;

wherein the computer uses its database of graph-based indices to further expand or narrow search results or retrieve and display additional metaset nodes from databases across subject matter, geographical, temporal, and technical reference points within the knowledge graph representation of search results;

wherein the computer adds links and nodes representing information from other databases to further alter search results, wherein the computer deletes links and nodes representing information from other databases to further alter search results;

wherein the nodes and links are selected from the following group: user profile related nodes, metrics nodes, and additional content nodes within the knowledge graph representation of search results;

wherein the computer recommends new metasets to further alter search results from usage statistics;

the computer recommending new metasets to further alter search results from databases;

the computer using algorithms to calculate how disparate nodes within a search related knowledge graph can be combined to meet search criteria;

wherein the computer recommends popular combinations of metasets based on factors chosen from the group: a number of recommendations, shared attributes between datasets, or a dataset's track record in data driven projects;

wherein the computer recommends combinations of metasets based on uncommon factors chosen from the group: recommendations from subject matter or technical experts, less used or newly uploaded metasets that correlate with search criteria, or with additional content reports on novel uses of datasets in different fields of study;

wherein the computer executes graph algorithms within a search related knowledge graph, the graph algorithms selected from the following group: shortest path, path of most shared metaset attributes, path of specific attributes of interest, Of and least costly path to find different relevant paths connecting nodes that are not directly linked to each other;

the computer producing a comparison report that analyzes how different individual or groupings of metasets best fit data requirements; and the computer tracking and storing usage statistics and maintaining usage metrics to help inform the machine learning processes used to execute functions chosen from the group: improving a metaset search engine of the computer and improving a recommendation engine of the computer.

9. The method of claim 8, further comprising:

the computer retrieving and displaying a searchable, visual, and interactive link and node knowledge graph from databases with enhanced metasets directly relevant to search criteria;

wherein nodes represent metasets related to search criteria and links represent the attributes shared between two metaset nodes;

wherein the computer retrieves and displays a number more than zero and that exceeds 5,000 metaset results in response to search criteria;

wherein the computer determines metaset node appearance using a weighted count of subject matter or technical expertise related to search criteria and of prior search criteria that have resulted in direct clicks through to an externally held dataset;

wherein the computer determines metaset node appearance using a weighted count of back end usage metrics;

wherein the computer determines link appearance using a number of shared attributes between two metaset nodes;

wherein the computer executes graph functions chosen from the group: bringing up descriptive information on links and nodes within the display, moving links and nodes of graph search results around within the display, or adding or deleting links and nodes within the knowledge graph;

wherein the computer executes graph searches to retrieve additional links and nodes within a search related knowledge graph;

wherein the computer displays alternate views of metasets chosen from the group:

descriptive details, ranked list representations, geographical representations, 3D representations, virtual representations, temporal representations, or statistical representations;

wherein the computer executes graph algorithms within a search related knowledge graph to find novel combinations between metaset nodes that are not directly linked to each other;

wherein the computer provides access to the external site where the data related to a dataset or data source represented in the metadata resides; and wherein the computer groups metasets in different combinations in response to search criteria or interactions with the search related knowledge graph.

10. The method of claim 8, further comprising:

the standardized process for ingesting metadata on datasets from external sources to create metasets so that each metaset contains attributes chosen from the group: common descriptors or metadata, less common metadata, or specialized metadata developed specifically for use in the computer;

wherein dataset metadata that is ingested describes any dataset that exists and resides outside of the computer;

wherein dataset metadata that is ingested describes any data source that exists and resides outside of the computer;

wherein metasets that are ingested into the computer undergo systematic vetting processes selected from the following group: verifying dataset ownership, verifying data source ownership, assessing data privacy policies, isolating malicious code, removing malicious code, and identifying known biases affiliated with a dataset or data source before being enhanced within the computer; and the computer using a standardized method to apply machine learning on ingested metadata to train the computer to extract, ingest, and transform key metadata features from external datasets or data sources into metasets.

11. The method of claim 8, further comprising:

the standardized process for enhancing metasets so that each metaset contains attributes chosen from the group: common knowledge of the subject matter, geographical references, temporal references, or technical specifics related to a metaset, uncommon knowledge of the subject matter, geographical references, temporal references, or technical specifics related to a metaset, or specialized knowledge of the subject matter, geographical references, temporal references, or technical specifics related to a metaset;

wherein the computer uses the standardized method to apply supervised, semi-supervised or unsupervised machine learning on enhanced metadata to train the computer to enhance metasets with common, uncommon, or specialized attributes with minimal or no human intervention.

12. The method of claim 8, wherein the computer links enhanced metasets to one another by a combination of geographical reference points chosen from the group: standard geographic indices, computer generated geographic tags, user generated geographic tags, or common, uncommon or specialized knowledge graphs of geographic attributes of metadata existing within the computer;

wherein the computer uses geographic reference points to execute search algorithms or expand or narrow searches for additional metaset nodes across attributes within a knowledge graph; and wherein the computer uses geographic reference points to execute search algorithms or expand or narrow searches for additional metaset nodes across alternate methods to visualize metasets chosen from the group: descriptive details, ranked list representations, geographical mapping representations, 3D representations, virtual representations, temporal representations, and statistical representations.

13. The method of claim 8, wherein the computer links enhanced metasets to one another by a combination of subject matter reference points chosen from the group: standard subject matter search methods or common, uncommon or specialized graph-based subject matter attributes of metadata existing within the computer;

wherein the computer uses subject matter reference points to execute search algorithms or expand or narrow searches for additional metaset nodes across attributes within a knowledge graph; and wherein the computer uses subject matter reference points to execute search algorithms or expand or narrow searches for additional metaset nodes across alternate methods to visualize metasets chosen from the group: descriptive details, ranked list representations, geographical mapping representations, 3D representations, virtual representations, temporal representations, and statistical representations.

14. The method of claim 8, wherein the computer links enhanced metasets to one another by a combination of temporal reference points chosen from the group: standard temporal search methods, semantically-based temporal references or common, uncommon or specialized graph-based temporal attributes of metadata existing within the computer;
   wherein the computer uses temporal reference points to execute search algorithms or expand or narrow searches for additional metaset nodes across attributes within a knowledge graph; and
   wherein the computer uses temporal reference points to execute search algorithms or expand or narrow searches for additional metaset nodes across alternate methods to visualize metasets chosen from the group: descriptive details, ranked list representations, geographical mapping representations, 3D representations, virtual representations, temporal representations, and statistical histograms.

15. The method of claim 8, wherein the computer links enhanced metasets to one another by a combination of technical reference points chosen from the group:
   common technical attributes, less common technical attributes or specialized technical attributes of metadata existing within the computer;
   wherein the computer uses technical reference points to execute search algorithms or expand or narrow searches for additional metaset nodes across attributes within a knowledge graph; and
   wherein the computer uses technical reference points to execute search algorithms or expand or narrow searches for additional metaset nodes across alternate methods to visualize metasets chosen from the group: descriptive details, ranked list representations, geographical mapping representations, 3D representations, virtual representations, temporal representations, and statistical representations.

16. The method of claim 8, further comprising:
   connecting the computer to a database of semantic and property graph-based indices that reflect common and less common knowledge on subject matter, geographic, temporal, or technical features as well as expert, domain-specific knowledge of subject matter, geographic, temporal or technical metaset reference points not obvious to the casual observer, and that enable the computer to map enhanced metaset nodes across shared attributes and add layers of metaset knowledge for more in-depth and informed searching;
   wherein different metasets are weighted and determined to be relevant to search criteria by connections via directly or indirectly linked attributes, across subject matter, geographic, temporal, or technical reference points, by specific user tags, or by back end usage statistics on prior related search criteria.

17. The method of claim 8, further comprising:
   the computer retrieving and displaying search related metaset results from databases directly into a knowledge graph representation of search results;
   wherein the computer executes search criteria from keywords, boolean logic, or in natural language expressions to retrieve new or update existing metaset results, or to expand or narrow search results for an existing knowledge graph;
   wherein the computer executes different algorithms selected from the following group: random path, graph traversal, weighted graph, breadth first or depth first algorithms, to respond to search criteria, retrieve new results, and alter search results within an existing knowledge graph;
   wherein the computer retrieves and displays new metaset results from databases within an interactive knowledge graph related to search criteria;
   wherein connections to a single node within a generated knowledge graph are followed to discover metasets that directly share similar attributes; and
   wherein connections across multiple links and nodes within a generated knowledge graph are followed to explore datasets that are indirectly linked through multiple degrees of node separation.

18. The method of claim 8, further comprising:
   the computer retrieving and displaying search related metaset results and additional metaset related information that is not directly related to search criteria directly within an existing knowledge graph representation of results;
   wherein the computer expands or narrows metaset attribute links or metaset nodes related to search criteria within an existing knowledge graph to retrieve and display new results not directly related to the original criteria from databases;
   the computer using its database of graph-based indices to further alter search results;
   the computer adding links and nodes representing information from other databases to further expand search results;
   the computer deleting links and nodes representing information from other databases to further narrow search results;
   wherein the computer recommends new metasets to further alter search results from usage statistics; and
   wherein the computer recommends new metasets to further alter search results from databases of subject matter and technical expert interactions.

19. The method of claim 8, further comprising: the computer using algorithms to calculate how disparate datasets represented in metaset nodes within a search related knowledge graph are combined to meet search criteria;
   wherein the computer recommends popular combinations of metasets based on factors chosen from the group: the number of user recommendations, their shared attributes, or their track record in data driven projects;
   wherein the computer recommends combinations of metasets based on factors chosen from the group: recommendations from subject matter or technical experts, less used or newly uploaded metasets that correlate with search criteria, or with additional content reports on novel uses of datasets in a related field of study; and
   wherein the computer executes graph algorithms selected from the following group: shortest path, path of most shared metaset attributes, path of specific attributes of interest, or least costly path, to find different relevant paths connecting metaset nodes within a search related knowledge graph that are not directly linked to each other.

* * * * *